United States Patent
Halke

(10) Patent No.: US 6,854,751 B2
(45) Date of Patent: Feb. 15, 2005

(54) OBJECT LIFTING AND MOVING DEVICE

(76) Inventor: Richard Paul Halke, 1333 Brockton Ave. Apt #6, Brentwood, CA (US) 90025

( * ) Notice: Subject to any disclaimer, the term of this patent is extended or adjusted under 35 U.S.C. 154(b) by 3 days.

(21) Appl. No.: 10/330,633

(22) Filed: Dec. 27, 2002

(65) Prior Publication Data

US 2003/0122345 A1 Jul. 3, 2003

Related U.S. Application Data

(60) Provisional application No. 60/345,904, filed on Dec. 31, 2001.

(51) Int. Cl.[7] .............................. A63G 25/00
(52) U.S. Cl. ................. 280/206; 280/205; 280/208
(58) Field of Search ............................ 280/205, 206, 280/207, 208, 47.3, 47.32, 78; 180/10, 7.1

(56) References Cited

U.S. PATENT DOCUMENTS

| 1,676,015 A | * | 7/1928 | Feick | 280/206 |
| 2,169,391 A | * | 8/1939 | Nilsson | 280/205 |
| 2,802,300 A | * | 8/1957 | Rogers | 280/205 |
| 3,066,951 A | * | 12/1962 | Gray | 280/206 |
| 3,076,666 A | * | 2/1963 | Geiser | 280/206 |
| 3,107,926 A | * | 10/1963 | Verge | 280/205 |
| 3,856,166 A | * | 12/1974 | Gibson | 214/370 |
| 3,905,617 A | * | 9/1975 | Smith | 280/206 |
| 4,163,567 A | * | 8/1979 | Barber | 280/208 |
| 4,324,413 A | * | 4/1982 | Bensette | 280/205 |
| 4,861,053 A | * | 8/1989 | Yeomans | 280/205 |
| 6,298,934 B1 | * | 10/2001 | Shteingold | 280/206 |

\* cited by examiner

Primary Examiner—Daniel G. DePumpo
(74) Attorney, Agent, or Firm—Mark J. Spolyar

(57) ABSTRACT

An apparatus facilitating the lifting and movement of objects. The present invention, in one embodiment, features a curved rim extending around a mounting plate to which an object or an object carrier can be attached. The object is mounted off-center relative to the central axis of the curved rim. According to the invention, a counter-balancing weight offsets the moment associated with the object to allow the moving device to roll along a surface, and thereby move the object, with application of a small amount of force. According to embodiments of the present invention, the curved rims include at least one section having an increased radius of curvature relative to other sections of the curved rim to promote rotation of the moving device.

24 Claims, 29 Drawing Sheets

OBJECT LIFTING AND MOVING DEVICE

RELATED APPLICATION

The present application claims priority from provisional application Ser. No. 60/345,904 filed Dec. 31, 2001 and entitled "Object Lifting and Moving Device."

FIELD OF THE INVENTION

The present invention relates to lifting and moving devices and, more particularly, to leverage-based devices facilitating the handling and movement of large and/or heavy objects.

BACKGROUND OF THE INVENTION

The prior art includes a wide variety of devices capable of lifting or otherwise moving an object. For example, dollies (i.e., platforms having rollers or casters) facilitate the movement of heavy objects. Forklifts employ hydraulics to lift and move large objects on pallets. Such lifting and moving devices, however, generally require the application of force independent of the gravitational force associated with the object. Accordingly, while the prior art lifting and moving devices fulfill their respective objectives, they do not disclose or suggest an object lifting and moving device that uses the subject object's own weight to facilitate the movement of the object.

SUMMARY OF THE INVENTION

The present invention provides an apparatus facilitating the lifting and movement of objects. The present invention, in one embodiment, features a curved rim extending around a mounting plate to which an object or an object carrier can be attached. The object is mounted off-center relative to the central axis of the curved rim. According to the invention, a counter-balancing weight offsets the moment associated with the object to allow the moving device to roll along a surface, and thereby move the object, with application of a small amount of force. According to embodiments of the present invention, the curved rims include at least one section having an increased radius of curvature relative to other sections of the curved rim to promote rotation of the moving device.

DESCRIPTION OF PREFERRED EMBODIMENT(S)

A. Operating Principles and Use of Moving Device

Figure 1:
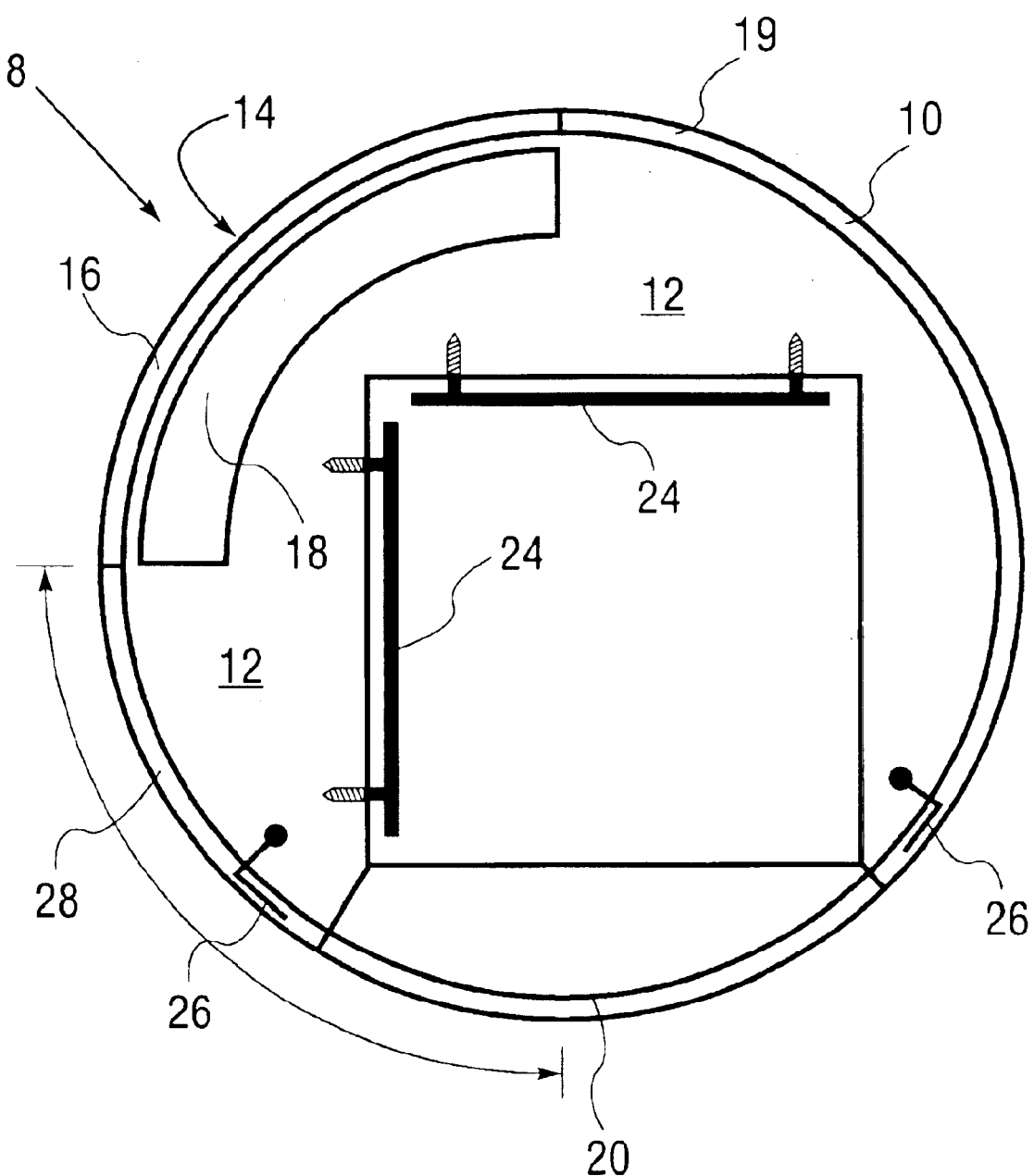
FIG. 1 is a side elevation view of the moving device according to an embodiment of the present invention.
Figure 2:
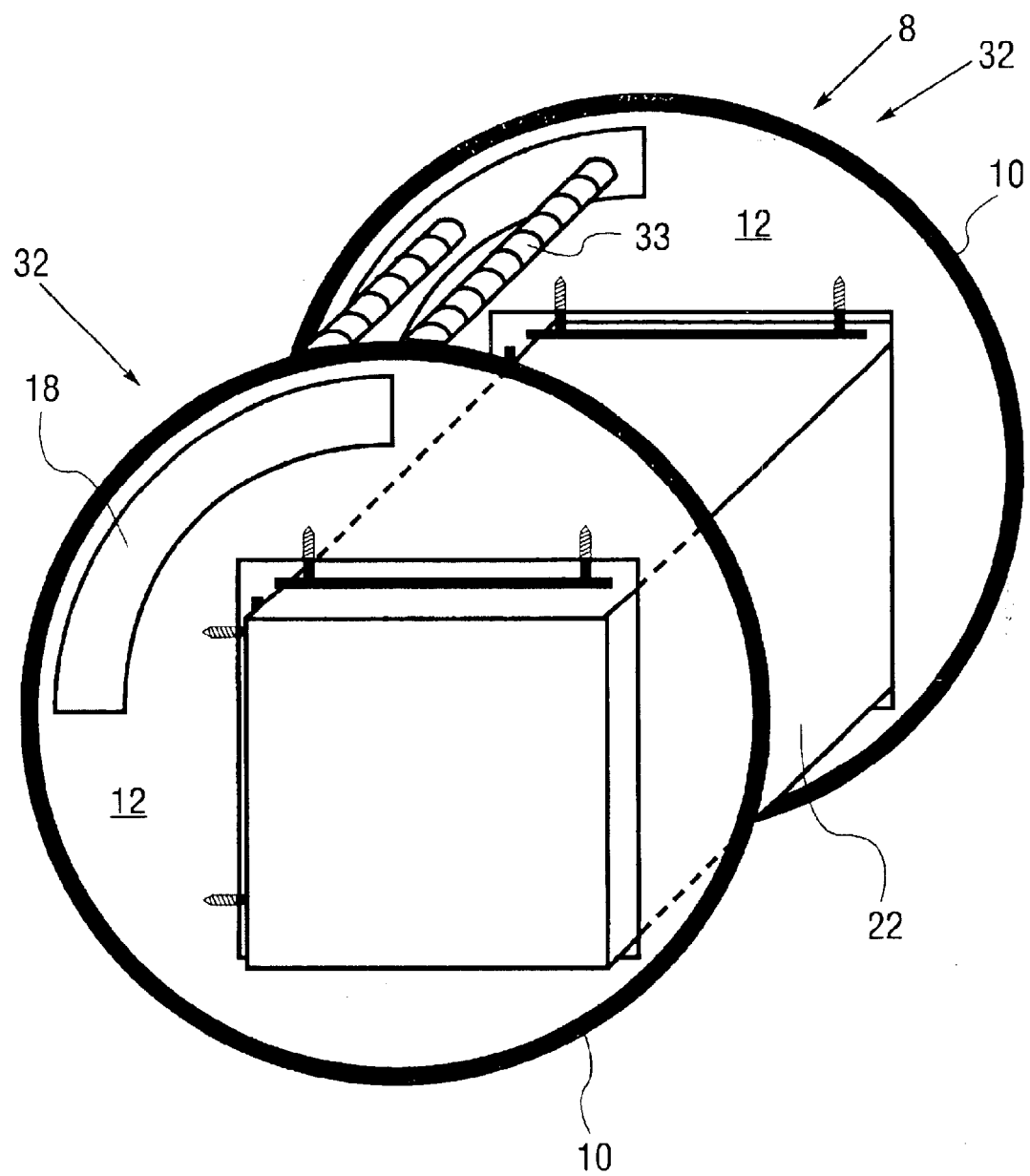
FIG. 2 is a perspective view of a moving device featuring two curved rims.

FIGS. 1 and 2 illustrate a moving device according to an embodiment of the present invention. In one embodiment, moving device 8 includes curved rim 10, mounting plate section 12, and counter balance weight 18. As FIG. 1 shows, mounting plate section 12, in the embodiment shown, includes a cutout/cavity to accommodate object 22. In one embodiment, moving device 8 includes adjustable bars 24 that can be adjusted to force object 22 against opposing sides of the cutout/cavity to hold object 22 in place. Object 22 can be square, circular or any other shape; accordingly, the cavity can be contoured and/or adjustable to accommodate variations in the profile of object 22. In addition, a mounting cage attached to the mounting plates 12 and extending between rims 10 and containing object 22 can be used in place of cavities in the mounting plates 12 for objects not fitting within the predefined cavity.

Figure 3:
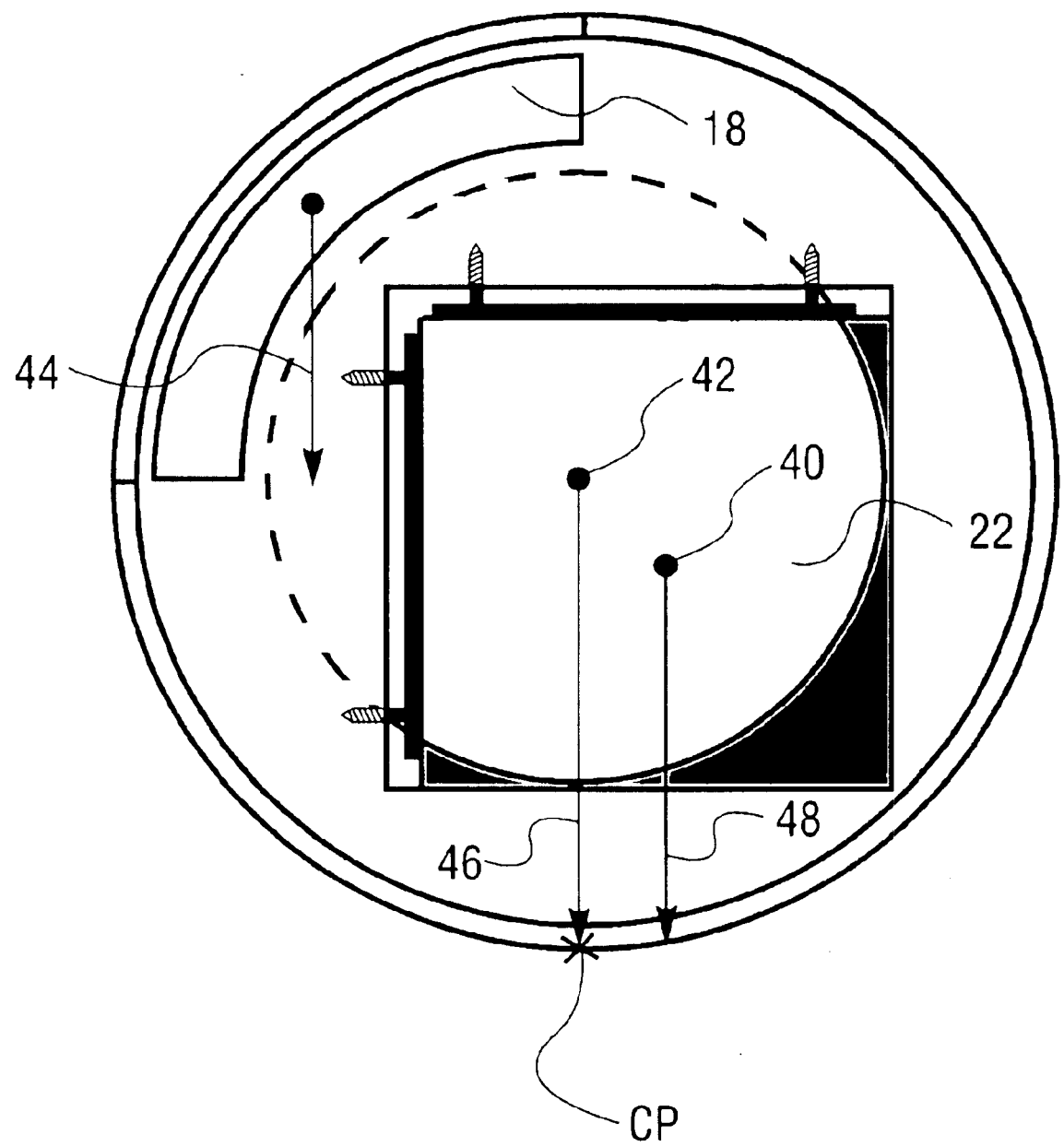
FIG. 3 is a diagram illustrating certain operating principles of the present invention.

As discussed herein, counter-balancing weight 18 offsets the gravitational force of object 22. Specifically, as FIG. 3 shows, the moment about contact point CP provided by gravitational force 48 of object 22 is substantially offset by the moment provided by the gravitational force 44 of counter-balancing weight 18. This configuration allows a user to easily rotate moving device 8 in the counter-clockwise or clockwise direction to effect rotation and consequent movement of moving device 8. As FIG. 3 shows, in light of the longer moment arm associated with counter-balancing weight 18, counter-balancing weight 18 need not weigh as much as object 22. Once object 22 is counter-balanced, the user need only supply a small amount of downward force, for example, to rotate moving device 8 and thereby move object 22. In one embodiment, depending on the configuration of counter-balancing weight 18, once the center-point 40 of object 22 is rotated beyond the other side of the central axis 42 of moving device 8, the weight of object 22 (and, in one embodiment, the increased radius of curvature in quadrant Q2) causes moving device 8 to complete a single rotation. In addition, outer rim 10 may include hollow section 16 adapted to be filled with water, dirt, sand, lead pellets, and the like to provide additional counter-balancing force.

As FIG. 2 illustrates, moving device 8, according to an embodiment of the present invention, includes two independent rim assemblies 32 holding an object 22. However, in one embodiment, rim assemblies 32 may be attached to one another with one to a plurality of beams 33 or other supports extending between the rim assemblies 32. Still further, in another embodiment, the present invention may be operated with one rim assembly having a sufficient width to operate independently.

In one embodiment, curved rim 10 is circular in profile; however, in other embodiments, curved rim 10 may be ellipsoid or oblong in profile. In a preferred embodiment, curved rim 10 includes region 28 having an increased radius of curvature relative to the remaining sections of curved rim 10. Region 28 promotes or facilitates the initiation of movement of moving device 8, as more fully described below. In other embodiments, curved rim 10 can include sections of varying radii of curvature to achieve desired objectives for the behavior of moving device 8. See FIG. 5A.

Figure 5A:
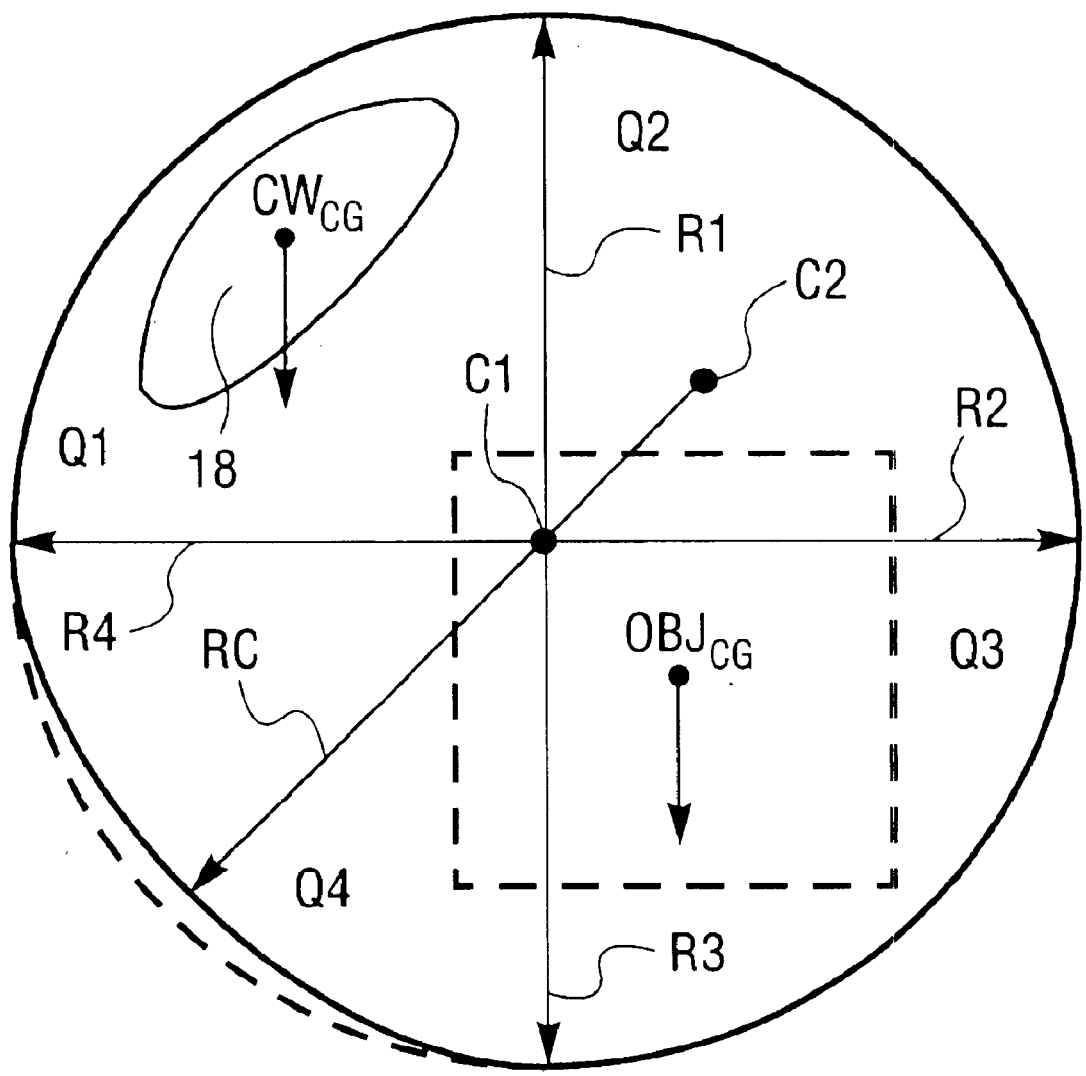
FIG. 5A is a diagram illustrating the profile of a curved rim according to an embodiment of the present invention.
Figure 5B:
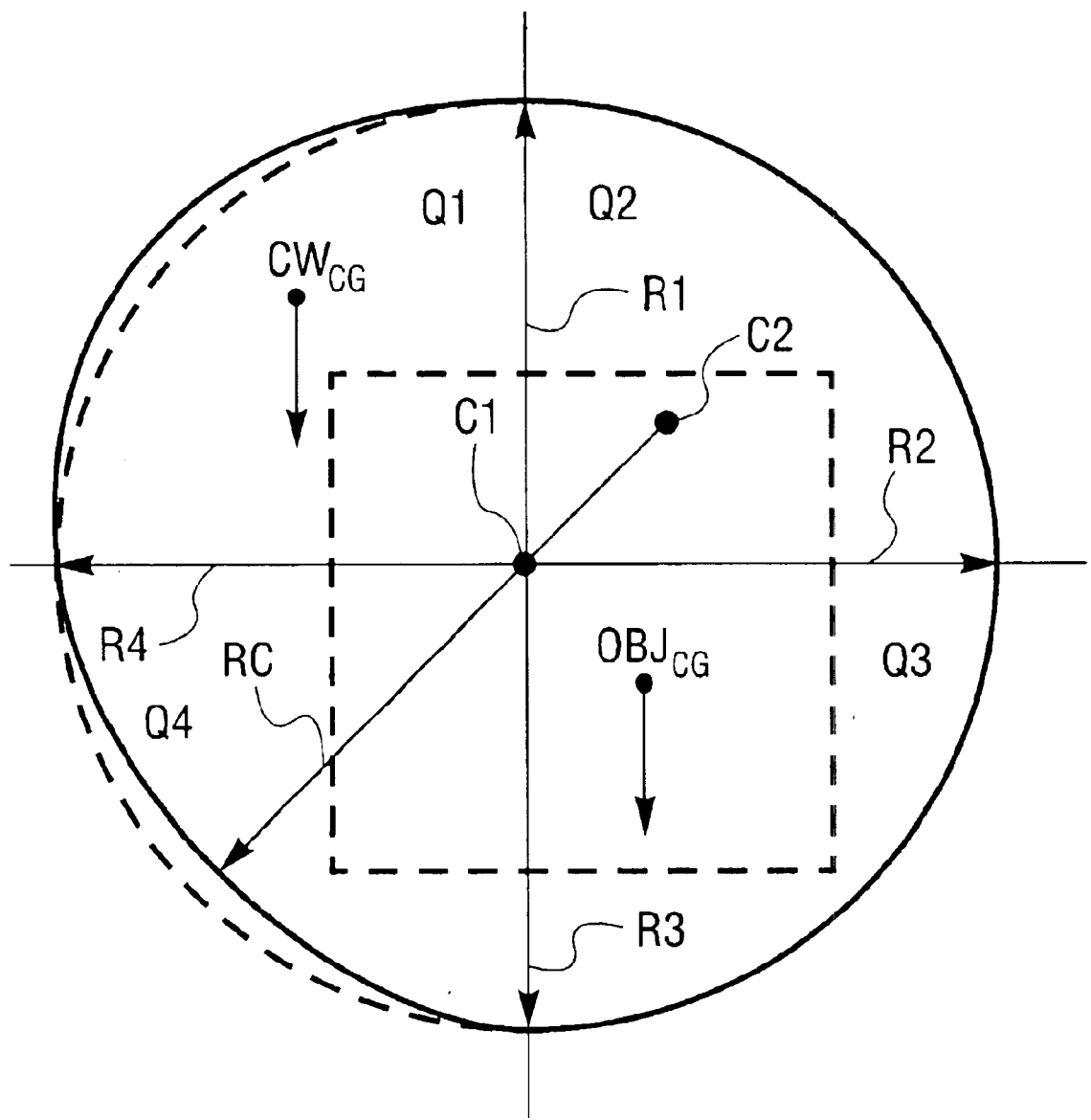
FIG. 5B is a diagram illustrating the profile of a curved rim according to another embodiment of the present invention.

FIG. 5A illustrates the profile of curved rim 10 according to an embodiment of the present invention. For didactic purposes, lines R1, R2, R3 and R4, extending from the central axis C1, divide curved rim 10 into quadrants, Q1, Q2, Q3 and Q4. As FIG. 5A illustrates, the center of gravity (CWcg) of the counter-balancing weight 18 lies within quadrant Q1, while the center of gravity (OBJcg) of the object 22 lies within the diagonally-opposing quadrant Q3. In the embodiment shown, the radius of curvature in the regions defined by quadrants Q1, Q2 and Q3 are constant and equal to the length of lines R1, R2, R3 and R4. The radius of curvature (RC) about center point C2 in the region defined by quadrant Q4 however is greater than the radius of curvature corresponding to the quadrants Q1, Q2 and Q3 to provide an increased angle of slope that promotes initial rotation of the moving device 8. One skilled in the art, however, will recognize that the region of curved rim 10 featuring an increased radius of curvature need not extend through the entire quadrant Q4 and may extend over a portion of quadrant Q4. In another embodiment, curved rim 10 may include a second region having an increased radius of curvature within the perimeter section defined by quadrant Q2. In one embodiment, the ratio between the radius of curvature between R1 and RC is about (R1:RC) 1:1.2. However, one skilled in the art will recognize that other ratios can be used depending on the desired characteristics of the moving device. In addition, as FIG. 5B illustrates, the curved rim in the region defined by quadrant Q1 may be configured to bulge out relative to the adjacent quadrants. Still further, the curved rim in the region defined by quadrant Q3 may also be configured to bulge out relative to adjacent quadrants.

The differing radii of curvature and resulting profile of curved rims 10 facilitates rotation of moving device 8. Specifically, the varying radii of curvature in combination with the respective locations of the object 22 and the counter-balancing weight 18 causes the moments provided by object 22 and counter-balancing weight 18 to change depending on the section of curved rims contacting the ground. For example, as the moving device 8 is rotated counter-clockwise such that curved rims 10 contact the ground in the region of quadrant Q2, the center of gravity OBJcg of object 22 shifts closer to the center of rotation C2 thereby reducing the moment provided by object 22 and allowing counter-balancing weight 22 to have more influence over rotation of moving device 8.

Curved rims 10 can be made of unitary construction, or can be comprised of multiple sections and easily assembled on site. The curved rim may have a wide variety of cross-section profiles; for example, curved rims 10 may be tube-like and therefore, circular in cross section. Curved rims 10 may also be flat bands extending around mounting plate 12. In one embodiment, curved rims 10 may also include a rubber tread extending around its outer surface. In addition, as the various Figures illustrate, curved rim 10 may be separate, but attached to mounting plate 12, or integrally formed with mounting plate 12 as a unitary part.

In one form, the curved rims 10 of moving device 8 can be vertically lowered around object 22 and secured thereto. The user then tilts the entire assembly such that curved rims 10 contact the ground. The assembly can then be rolled as described below to effect movement of object 22. Alternatively, object 22 can be lowered within the cavity provided by mounting plate section 12. In one embodiment, object 22 can be moved horizontally within the cavity of mounting plate 12 (using a fork lift or other moving device) while the curved rims are in an upright orientation.

Figure 4:
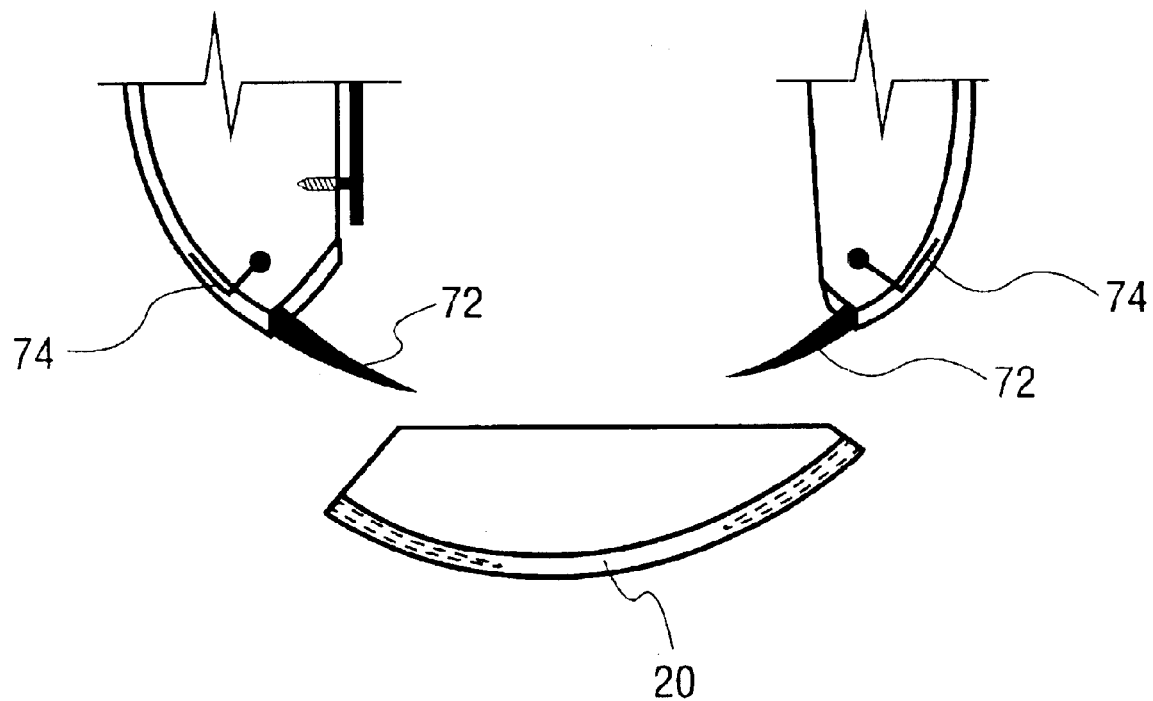
FIG. 4 is side view of the moving device with the bottom support section removed.

In one embodiment, curved rim 10 includes C-shaped section 19 and removable bottom section 20 (See FIG. 4). In one embodiment, curved rim includes spikes 72 that engage corresponding cavities in bottom section 20 to hold bottom section 20 in place. As FIG. 4 provides, a user may retract spikes 72, using lever assemblies 74. In another embodiment, spikes 72 may be hydraulically operated to allow for use of moving device 8 with heavier objects 22.

In one embodiment, if object 22 is too heavy to allow a user to slip bottom section 20 under object 22, bottom section 20 may be removed by retracting spikes 72. The "C" shaped remaining section 19 may then be slipped over object 22. To allow for lifting of object 22 and replacement of bottom section 20, the user extends spikes 72 to grasp object 22 and partially lift it off the ground (see FIG. 4). The user then rotates moving device 8 counter-clockwise to expose the open region of the "C" shape section 19 (when it is upside-down) and allow the user to attach bottom section 20 to the remaining section to effect smooth and complete rotation of moving device 8. Alternatively, C-shaped section 19 may be oriented such that the cavity in mounting plate 12 faces upwardly, allowing object 22 to be lowered into the cavity and bottom section 20 to be attached.

In one embodiment, by simply placing the "C" shaped rims 10 onto object 22 and pushing down on rims 10 in the counterbalance area, object 22 will lift off the ground slightly, offering the opportunity to lock the holding spikes 72 opposite the counterbalance region into position. The user then simply reverses this action to extend the opposite spike below the counterbalance region. Once the spikes have been extended (FIG. 4), the user will then be able to safely roll the object 22 over until it is upside-down. At that point, the user can retract the spikes and re-attach the missing support section 20 for a smoother, non-stop rotation, or the user can choose to operate moving device 8 as is with the spikes holding object 22 in place.

Figure 14A:
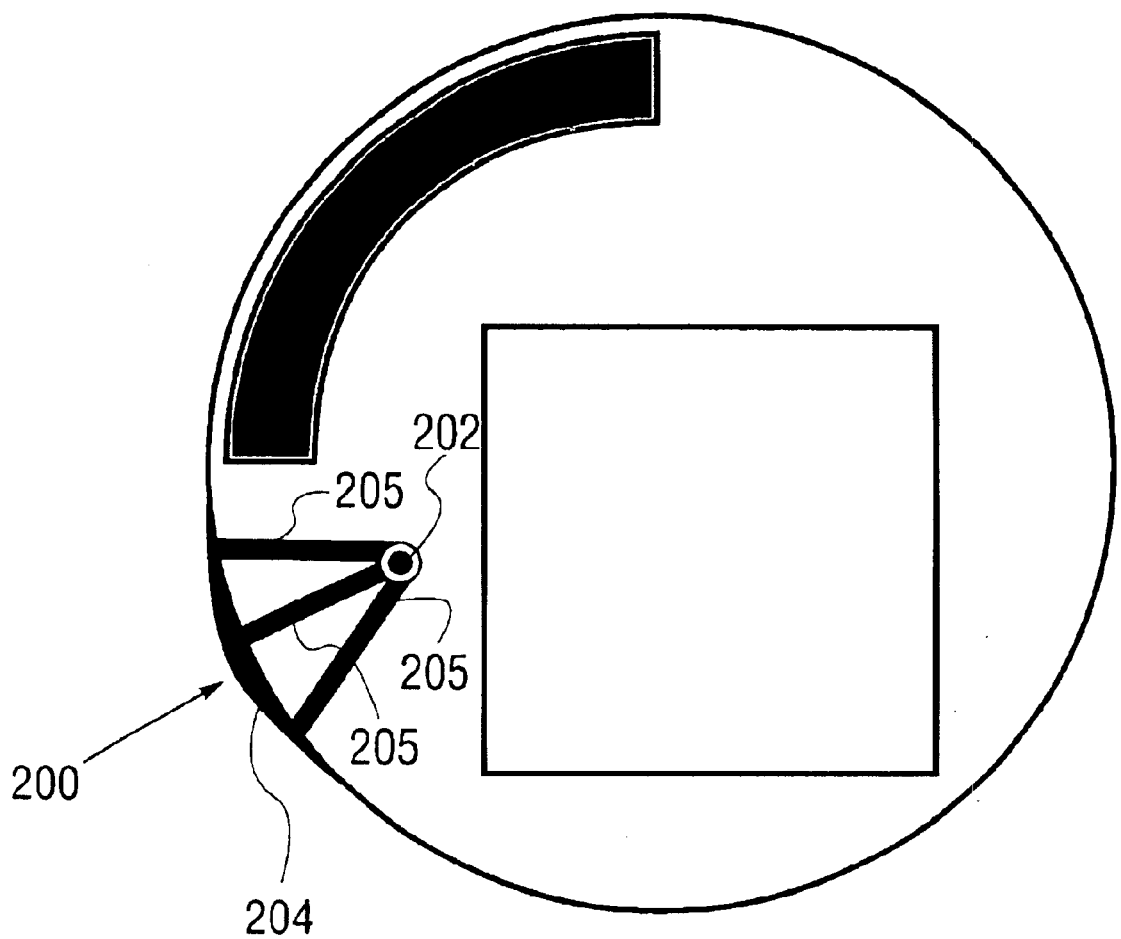
FIGS. 14A, 14B and 14C show a mechanism, according to an embodiment of the present invention, directed to turning the moving device as it rotates.
Figure 14B:
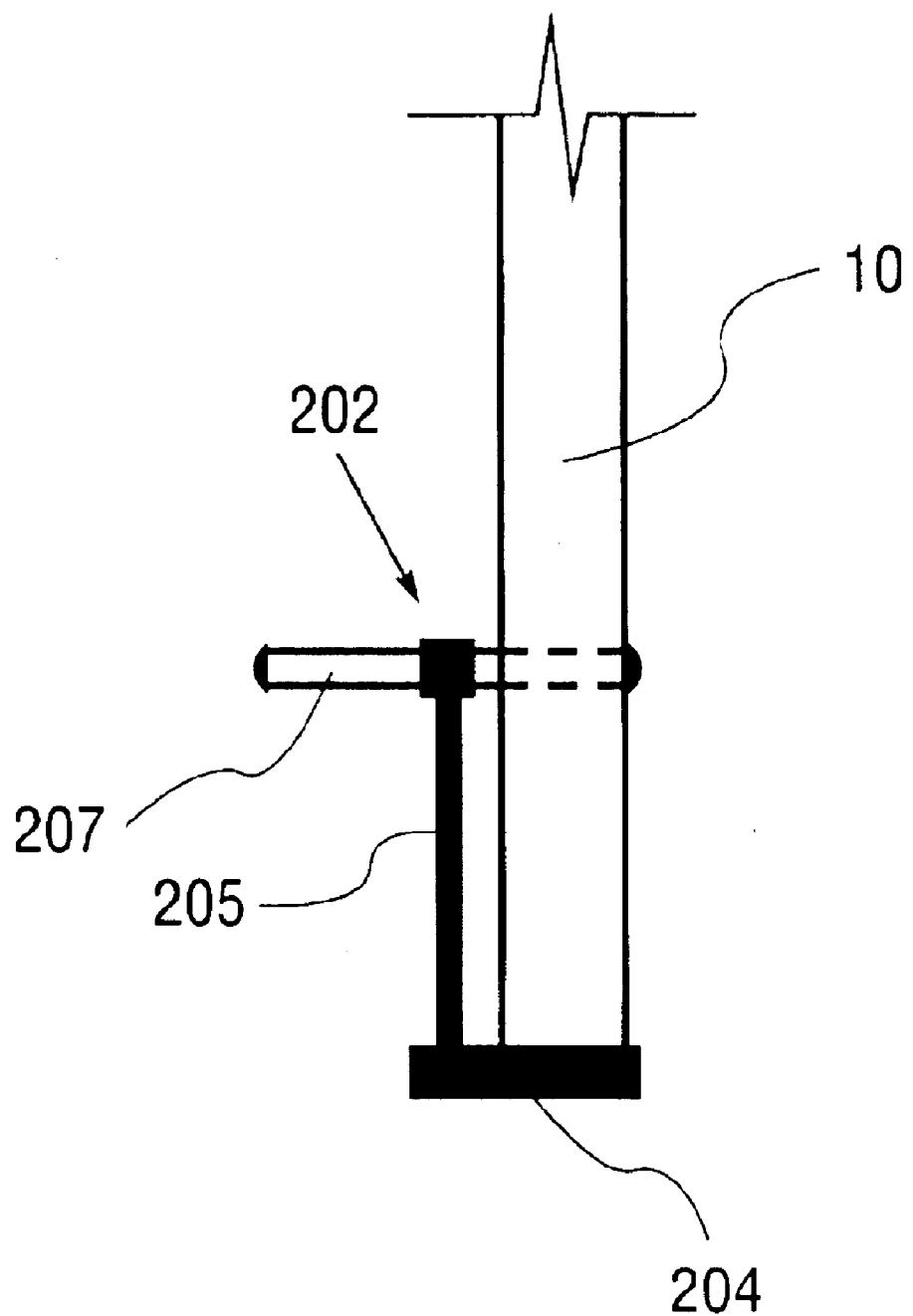
Figure 14C:
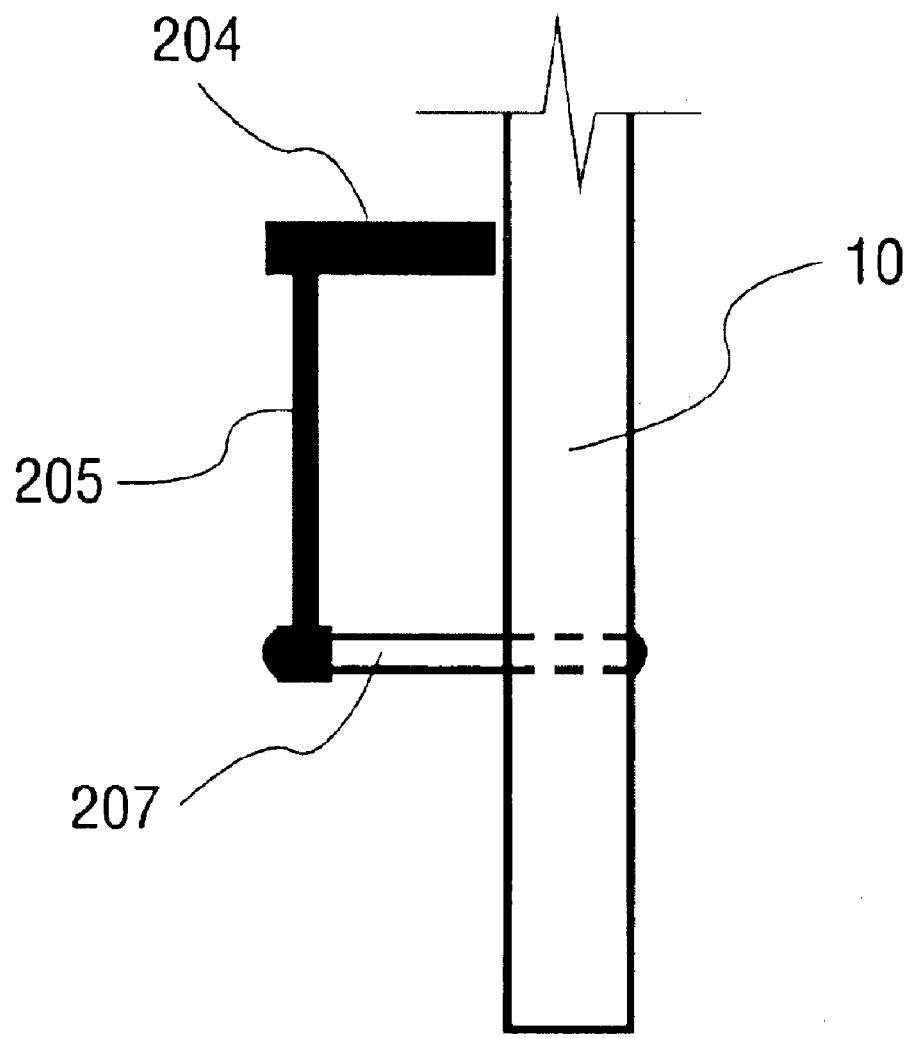

Moving device 8 can also be configured to allow for steering or turning during rotation. For example, in embodiments featuring two curved rims 10, each curved rim 10 may include a feature that increases/decreases the outer circumference of one of the rims 10 to cause the assembly to turn left or right as the rims 10 rotate. FIGS. 14A and 14B illustrate a mechanism 200, according to an embodiment of the present invention, that operates to increase the outer circumference of curved rim 10 to cause the moving device 8 to turn as it rotates. The mechanism 200, in one embodiment, comprises arms 205 extending from axis 202 and attached to lip section 204. The inner surface of lip section 204 substantially conforms to the outer surface of curved rim 10 in the area where lip section 204 contacts it when in the engage position (see FIG. 14A). The width of lip section 204, in one embodiment, is configured such that it extends even with the opposite edge of the curved rim 10. Mechanism 200 is rotatably attached to and slidable along axis 202. Specifically, as FIGS. 14B and 14C demonstrate, mechanism 200 is attached to rod 207 extending from mounting plate 12 of curved rim 10. Accordingly, to place mechanism 200 into position, the user pulls mechanism 200 out along rod 207 to allow lip section to rotate outwardly past curved rim 10 and then pushes the mechanism 200 inwardly to lock mechanism in place against curved rim 10 as shown in FIG. 14B. To disengage mechanism 200, the user again pulls the assembly out along rod 207 and rotates it inwardly as shown in FIG. 14C. As discussed above, the user may selectively engage mechanism 200 on either the left or right curved rim 10 to cause the moving device to turn as it rotates. In addition, rims 10 may also include a braking/kickstand feature, which when engaged, resists rotation of rims 10. In another embodiment, rotation of moving device 8 may also be prevented by adjusting the position of counter-balance weight 18 out of balance, thereby causing the object's 22 own weight to resist rotation of moving device 8.

Moving device 8 can be made of any suitable material depending upon the size and density of object 22. For example, curved rims 10 can be made of hollow or solid steel tubing, aluminum, plastic, wood, reinforced concrete, and the like. In one embodiment, rims 10 can be made of rubber and inflated around object 22. In addition, as one skilled in the art will recognize, the dimensions of moving device 8 depend on the dimensions and weight of object 22.

In one embodiment, counter-balancing weight 18 comprises metal weights removably attached to mounting plate 12. In another embodiment, counter-balancing weight 18 can be effected by a chamber (such as a steel or plastic chamber) that is filled with water, dirt, stone and the like. Such material can be removed to facilitate shipping and transportation of moving device 8. In one embodiment, counter-balancing weight 18 comprises a pre-loaded section or chamber and a chamber allowing for adjustments to the weight of counter-balancing weight 18. In one embodiment, the position of counter-balancing weight 18 is adjustable to allow for further adjustments to operation of moving device 8. In addition, external cross-member bars mounted within region 14 could also be utilized if additional force was required to counter-balance the weight of object 22. Hollow section 16 can similarly be filled (or pre-filled) with water, dirt, stone and the like. In one form, the cross sectional aspect of hollow section 16 can be expanded to accommodate additional counter-balancing materials. In addition, the counter-balancing weight 18, when used in embodiments having two or more curved rims 10, can be distributed between the curved rims or be attached to a single curved rim.

As discussed above, by securing object 22 off-center within moving device's 8 pair of curved rims 10, and correctly balancing the off-centered load on the opposite side of the rims with counter-balancing weight 18, the user may easily move object 22. That is, as long as object 22 is counterbalanced within rims 10, moving device 8 may be rotated to effect movement of object 22. Specifically, a user, with a simple downward pull, or upward push, on the counter-balance region 14, can now make moving device 10 and object 22 roll. Then, once at the desired location, the user need only remove rims 10. In one embodiment, removable section 20 facilitates removal of object 22 from the assembly. In one embodiment, a track laid between curved rims 10 is operative to control the path of moving device 8 as it rotates.

The user may adjust the placement and/or magnitude of counter-balancing weight 18 (and, in other embodiments, the placement of object 22) to control the behavior of moving device 8. As discussed above, the increased radius of curvature of region 28 facilitates this initial counter-clockwise rotation of moving device 8. Depending on the desired effect, with just an occasional push, the user can make moving device 8 continuously rotate under its own momentum. If moving device 8 is correctly balanced, then it will only move in a substantial manner when the user applies a force to curved rims 10. Adjustments to the counterbalancing of the system affects the behavior of moving device 8. For example, if the user wants to have moving device 8 "whip around," the user adjusts the weight and/or position of counter-balance, then the user applies a downward force until object has passed the upside-down half way point. As discussed above, once the center point 40 of object 22 is rotated to the left (relative to the figures) of center point 42 of moving device 8, the weight of object 22 causes a single complete rotation.

B. Additional Embodiments

Figure 6:
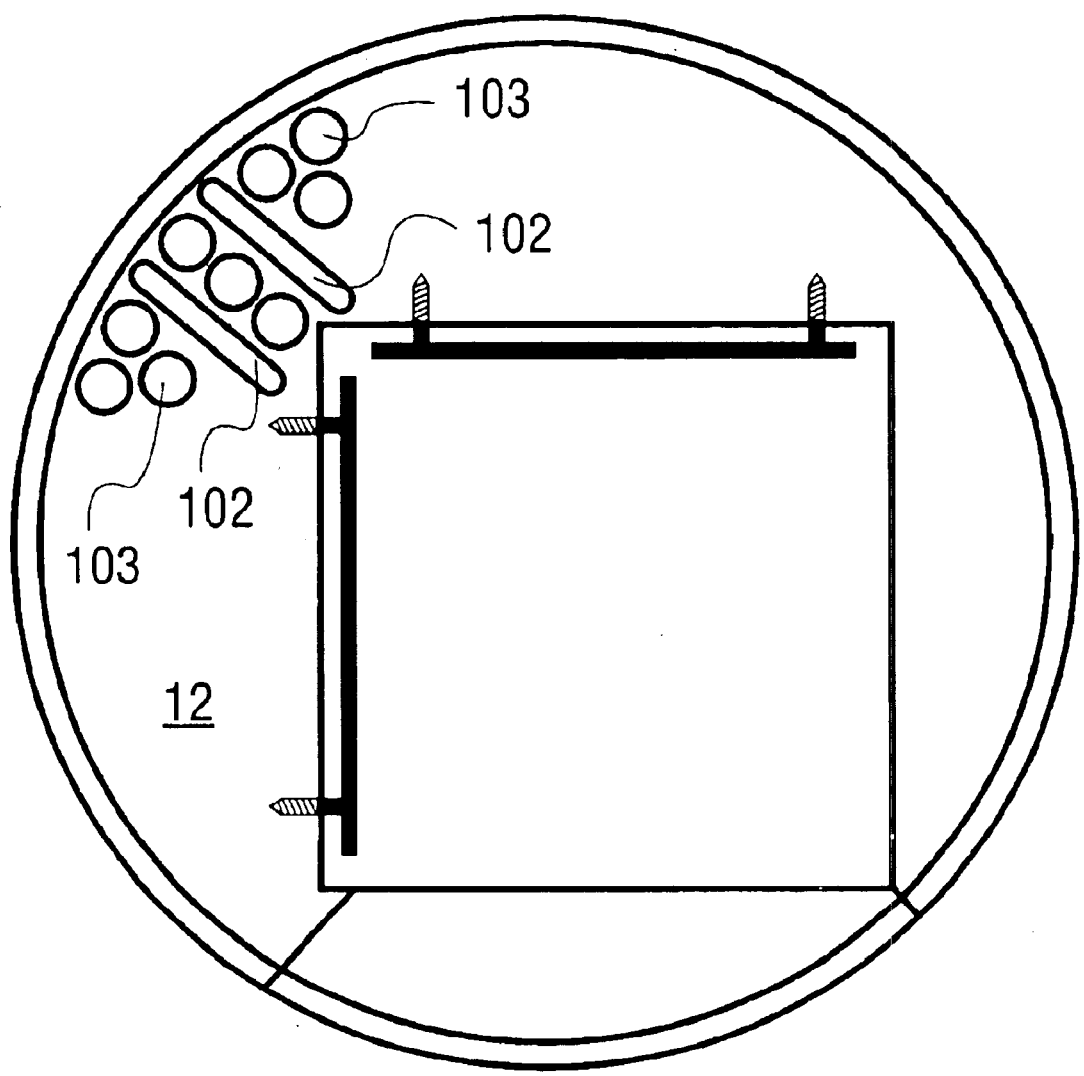
FIG. 6 is a side elevation view of the moving device according to another embodiment of the present invention.

As the various Figures and accompanying description indicate, the present invention can be implemented in a wide variety of embodiments. As FIG. 6 provides, the counter-balancing weight 18 may comprise a fixed weight (not shown) releasably attached within grooves 102. In use, the operator may adjust the position of the fixed counter-balancing weight by loosening an attachment and sliding the counter-balancing weight along grooves 102. In addition, mounting plate 12 may include one or more holes 103 allowing for the attachment of additional weights to counterbalance the weight of object 22.

Figure 9A:
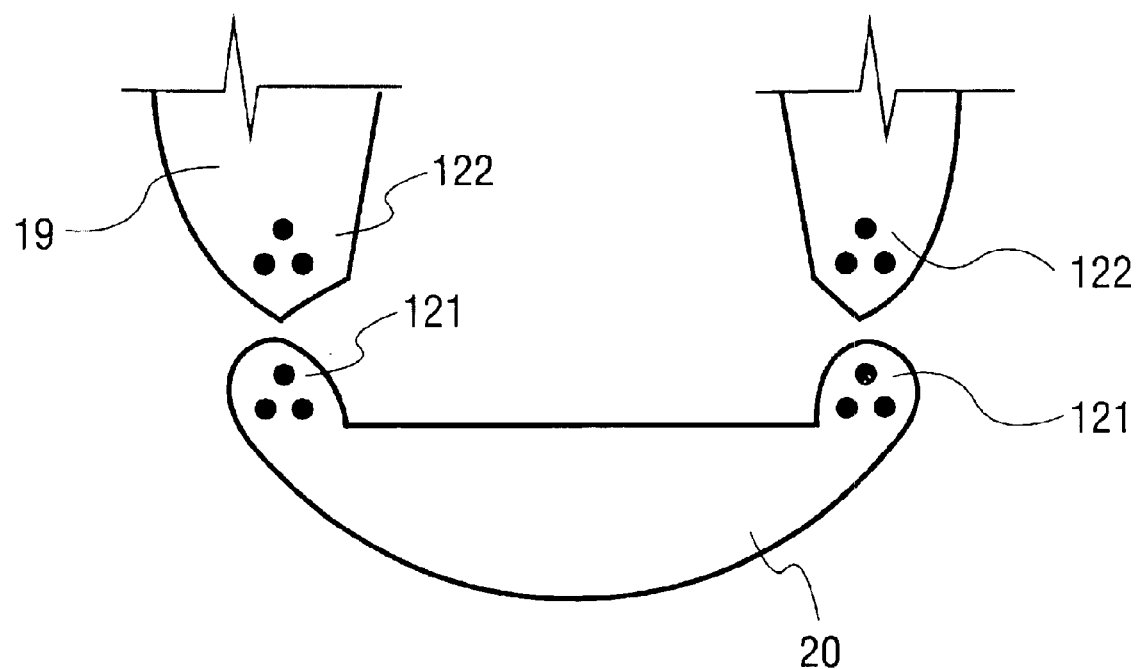
FIGS. 9A and 9B illustrate the attachment, according to an embodiment of the present invention, of the removable bottom section to the C-shaped section that together create the curved rim.
Figure 9B:
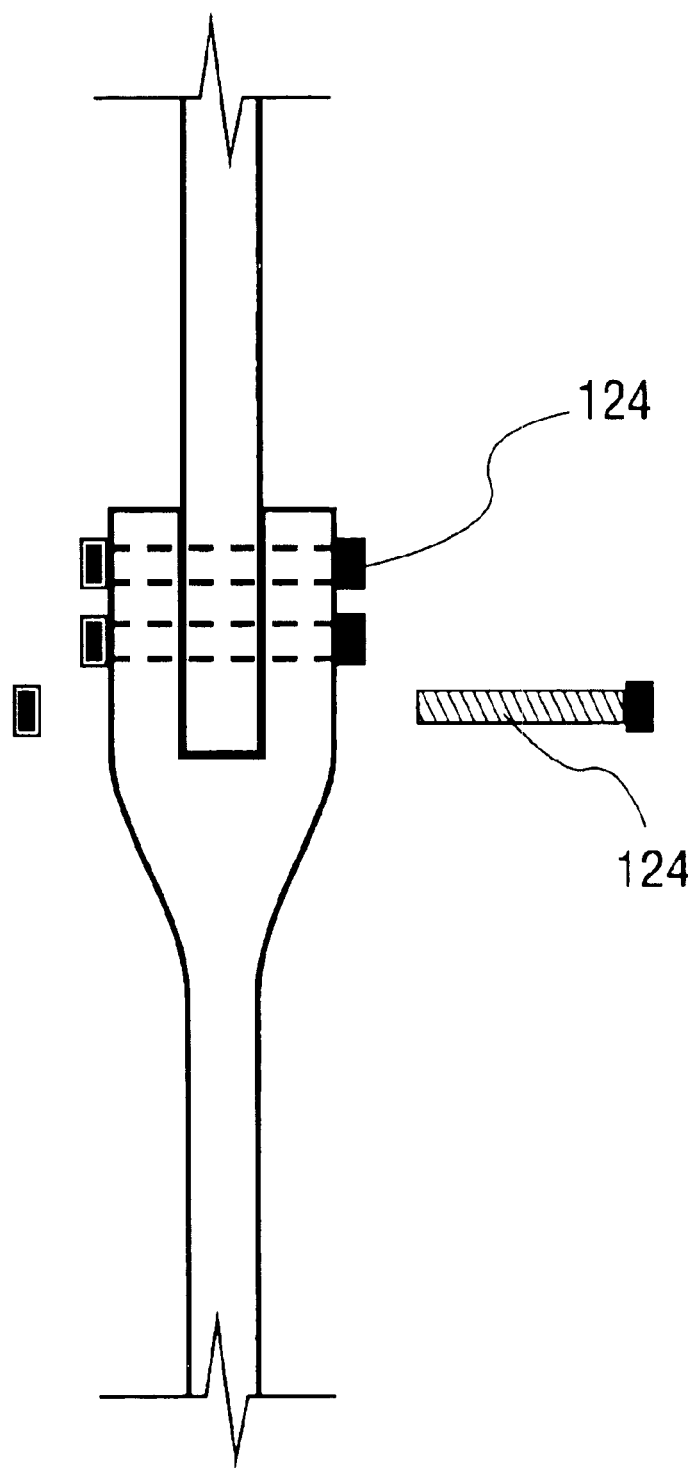

In addition, FIGS. 9A and 9B provide an alternative mechanism for attaching bottom section 20 to C-shaped section 19. As FIGS. 9A and 9B illustrate, bottom section 20 includes joint sections 121 that engage corresponding joint sections 122 at the ends of C-shaped section 19. Joint sections 121 and 122, in one embodiment, include holes 123 allowing bolts 124 to secure bottom section 20 to C-shaped section 19.

Figure 11:
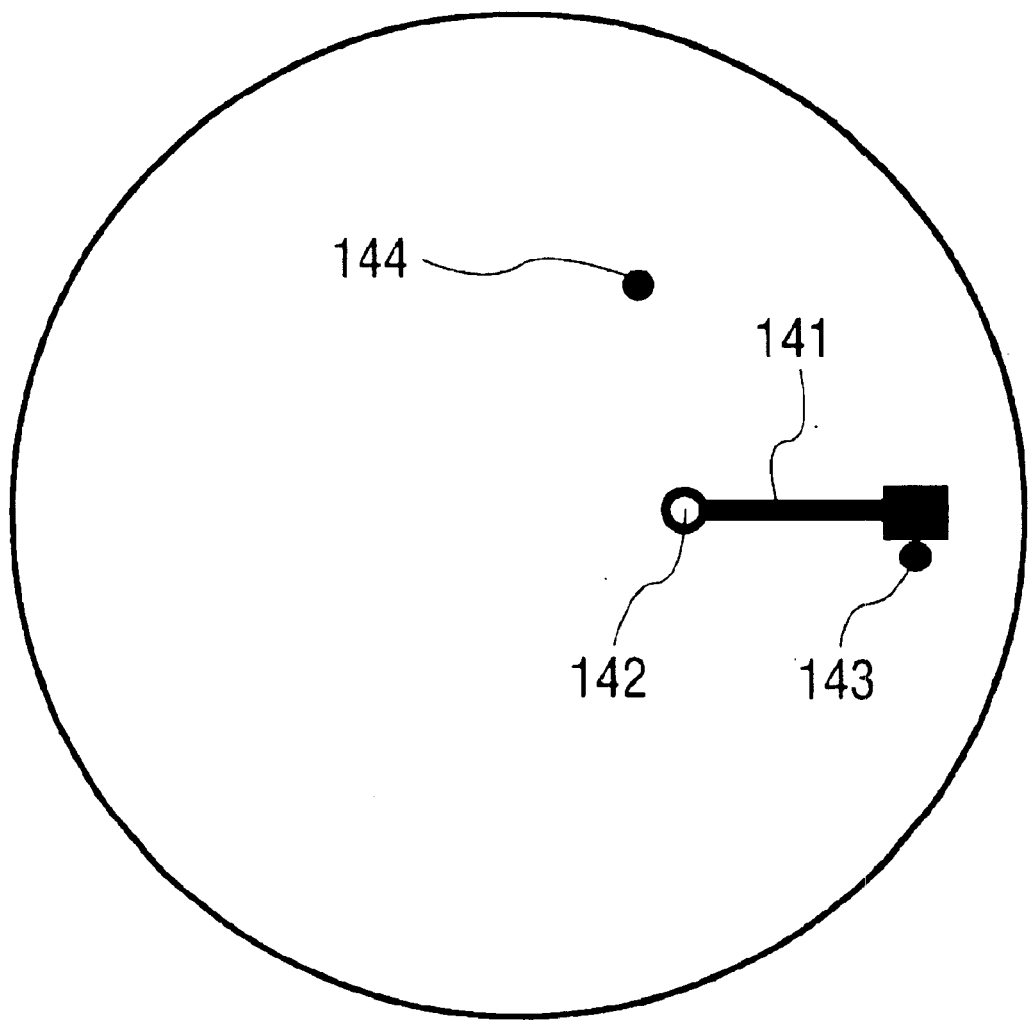
FIG. 11 shows an embodiment of the moving device according to the present invention featuring a pivoting weight that promotes rotation of the moving device.

Still further, the moving device 8 may be configured to include a pivoting weight 141, in the region of the counter-balancing weight 18 and/or the object 22, that promotes rotation of the moving device. As FIG. 11 shows, the moving device, in one embodiment, includes a weight 141 that pivots about axis 142 between pegs 143 and 144. As FIG. 11 illustrates, at a specific point in the rotation of the device, weight 141 falls forward to promote rotation of the device. As the device continues through its rotation, the weight 141 naturally swings back into place against peg 143 and is therefore ready to fall forward at the same point in the next revolution.

Figure 7A:
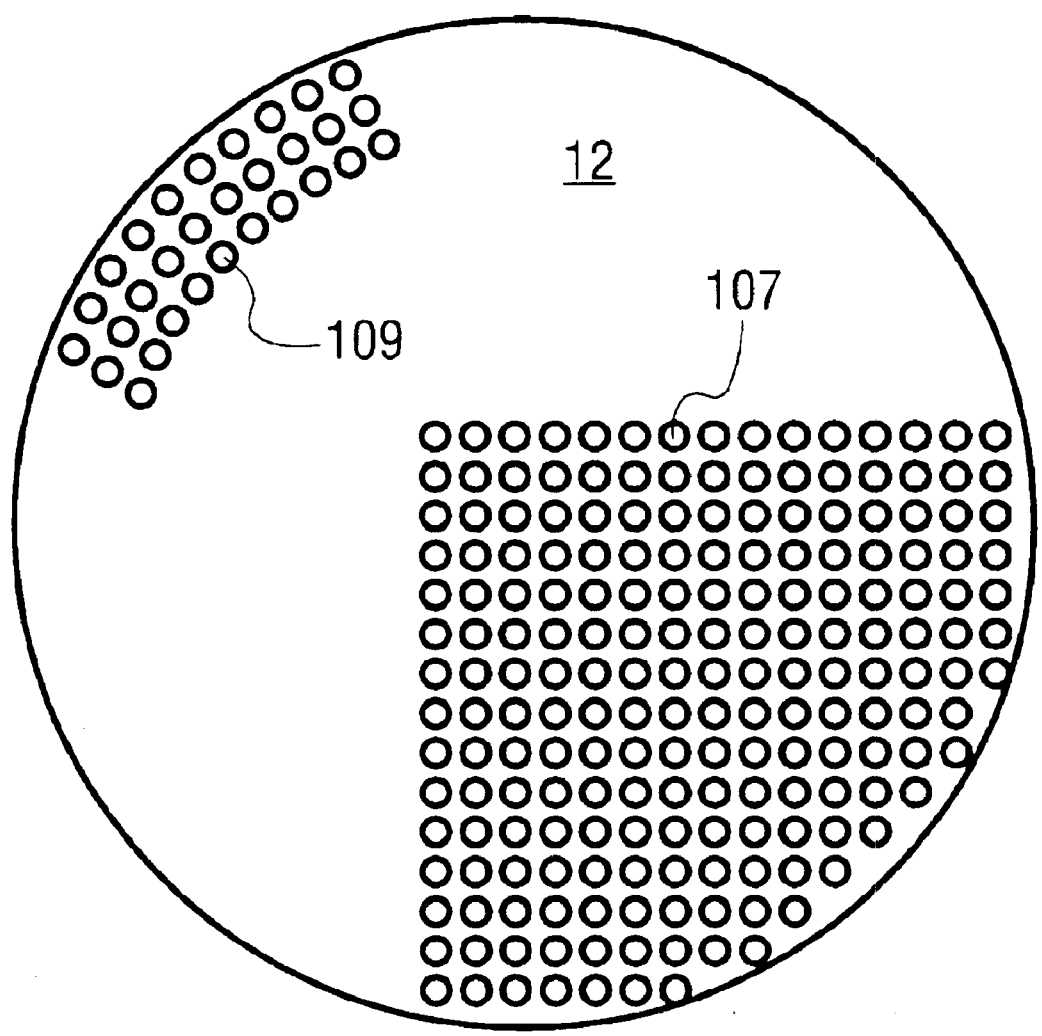
FIGS. 7A, 7B and 7C illustrate another embodiment of the present invention featuring an alternative mechanism for securing objects or object carriers to the curved rims.
Figure 7B:
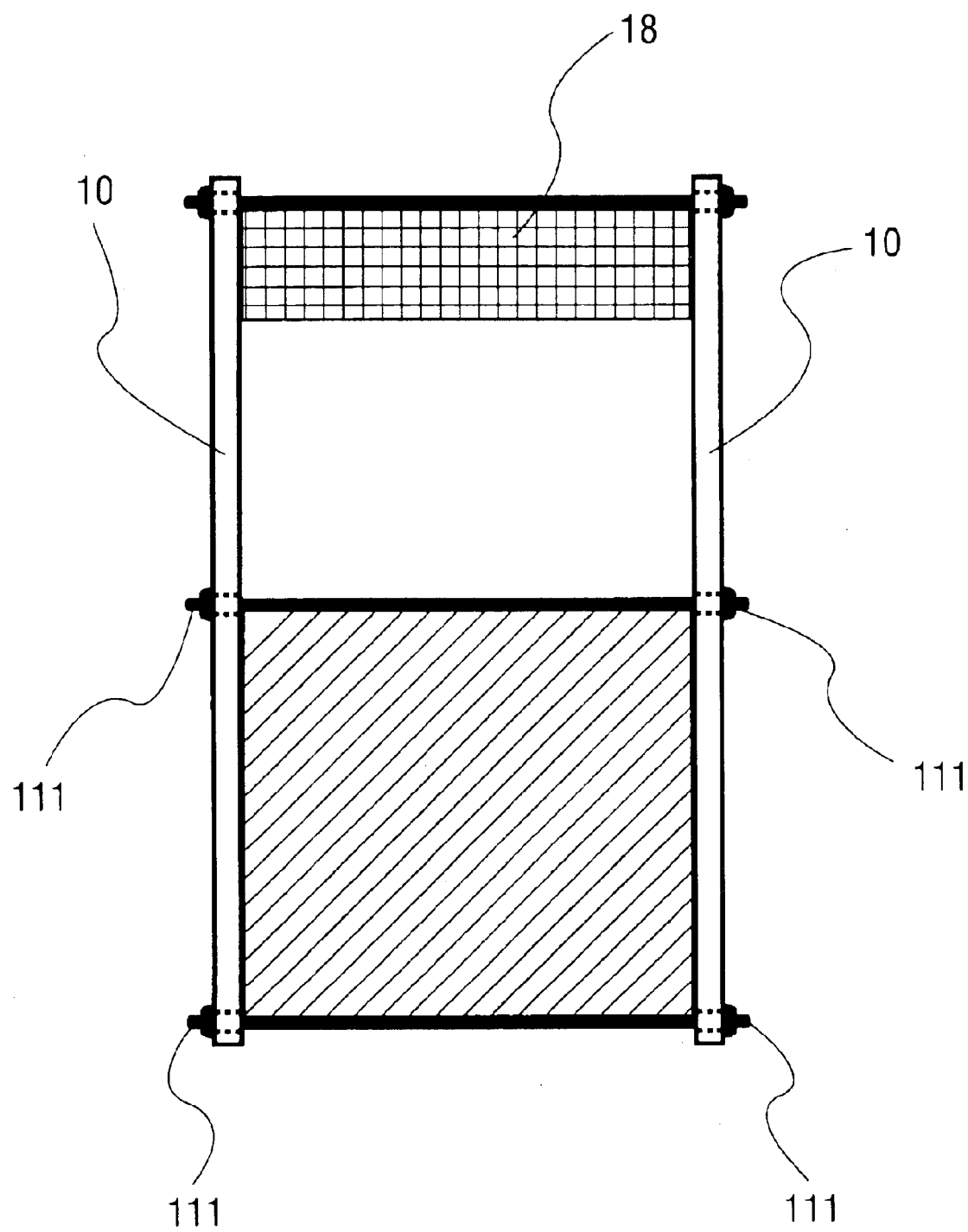
Figure 7C:
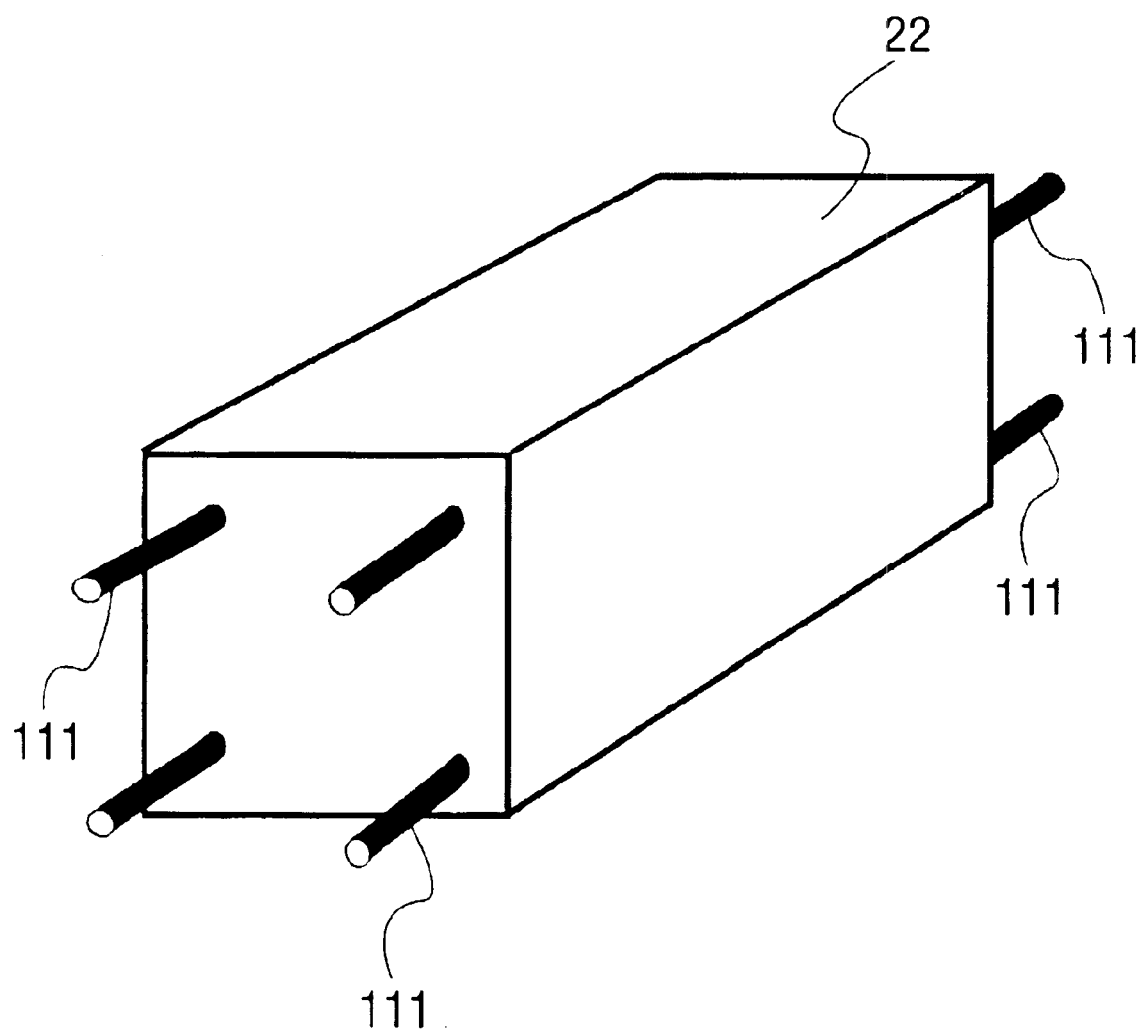

FIGS. 7A, 7B and 7C illustrate another embodiment of the present invention, wherein mounting plate 12 includes a plurality of holes 107 which can be used in connection with rods or pegs to secure an object, or a cage or container holding an object, to the moving device. In one embodiment, mounting plate 12 includes at least four holes 107 allowing for attachment of a cage or object in a fixed orientation relative to the central axis of the device. As one skilled in the art will recognize, less than four holes (and corresponding pegs) can be used to secure the object or container/cage to the mounting plates 12. In another embodiment, mounting plate 12 includes a matrix of holes 107 (as shown) allowing for selective placement of the object or cage/container relative to the central axis of the device. In one embodiment, mounting plate 12 includes at least one hole 109 to which one or more counter-balancing weights may be attached. As FIG. 7C shows, in one embodiment, object 22 includes rods or pegs 111 extending laterally therefrom. As FIG. 7B illustrates, the rods or pegs 111 are positioned in selected holes 107 of mounting plate 12 and secured thereto. Counter-balancing weight 18 can be attached in a similar manner. A variety of mechanisms can be employed to secure pegs 111 to the mounting plate 12. For example, the pegs 111 may include threads at their ends, allowing large wing-nuts to engage the threads and secure the assembly. Alternatively, the pegs 111 may include holes extending laterally therethrough allowing cotter pins to secure the assembly. One skilled in the art will recognize that the pegs can be secured to the mounting plate 12 in variety of ways without departing from the scope of the present invention.

Figure 8A:
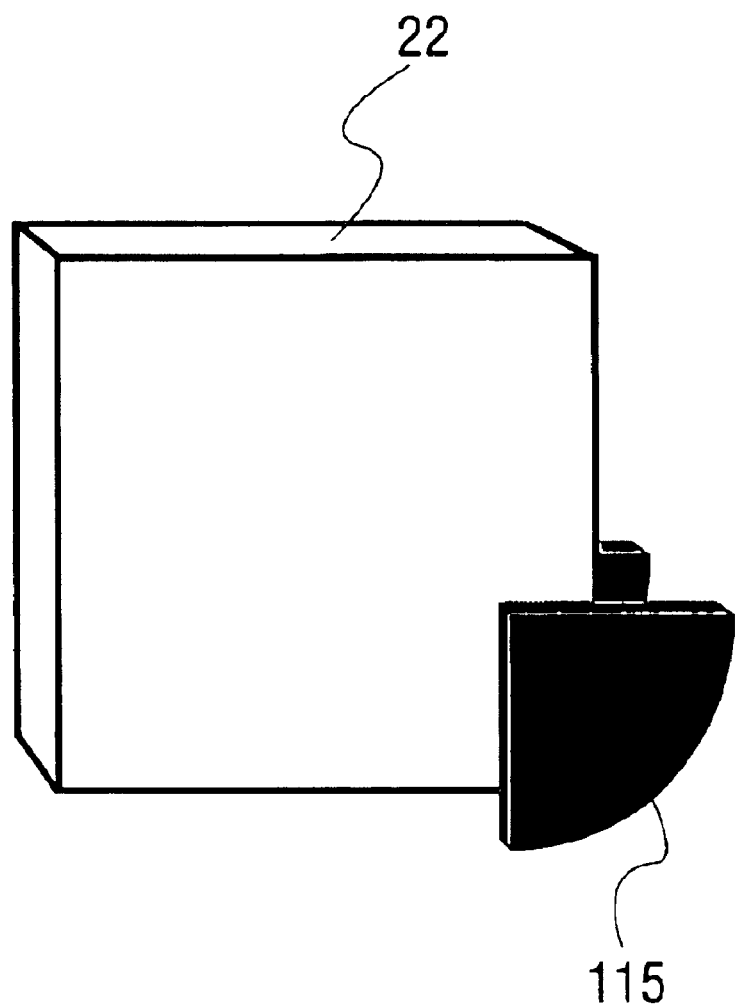
FIGS. 8A, 8B and 8C provide an additional embodiment of the present invention featuring yet another mechanism for securing objects or object carriers to the curved rims.
Figure 8B:
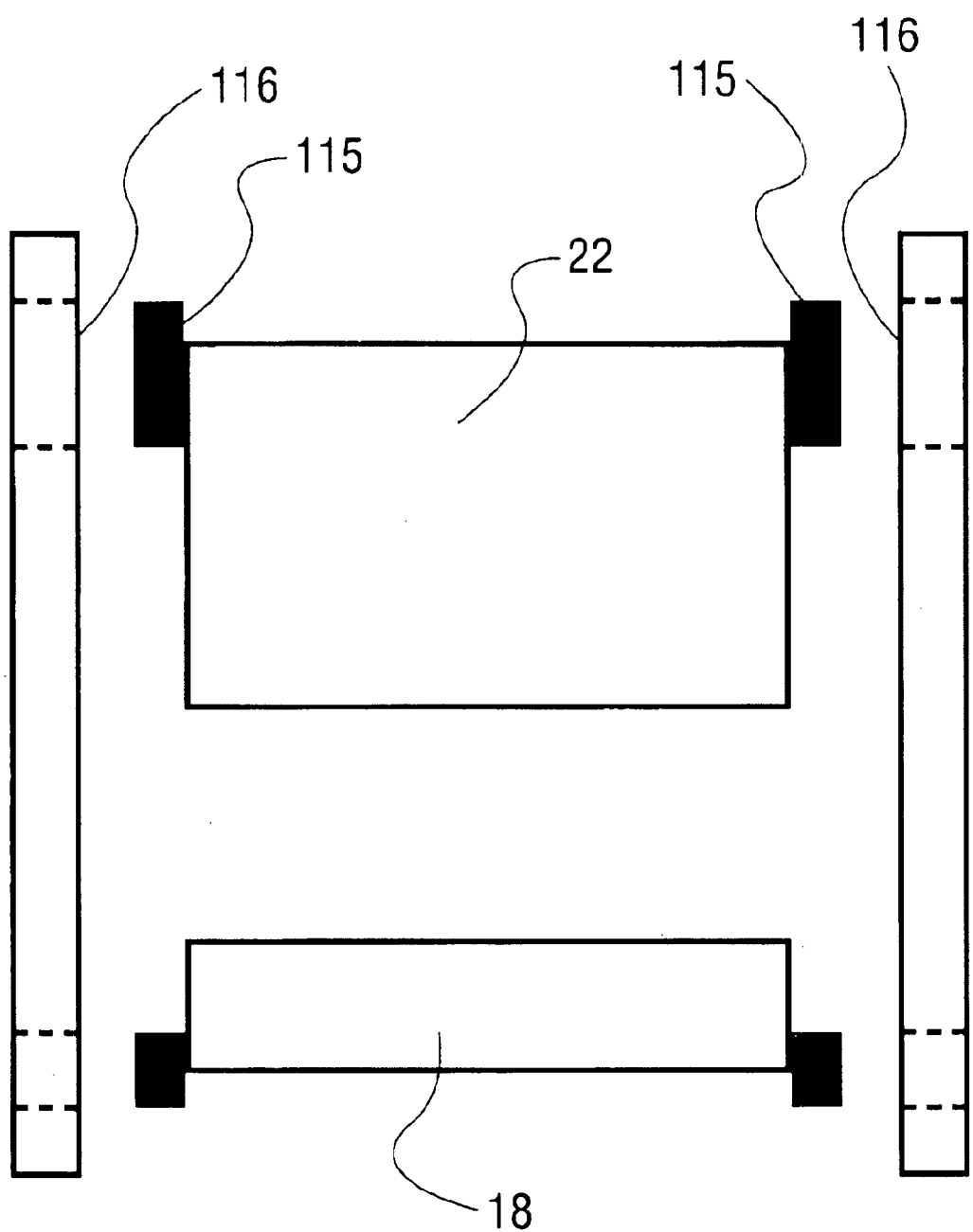
Figure 8C:
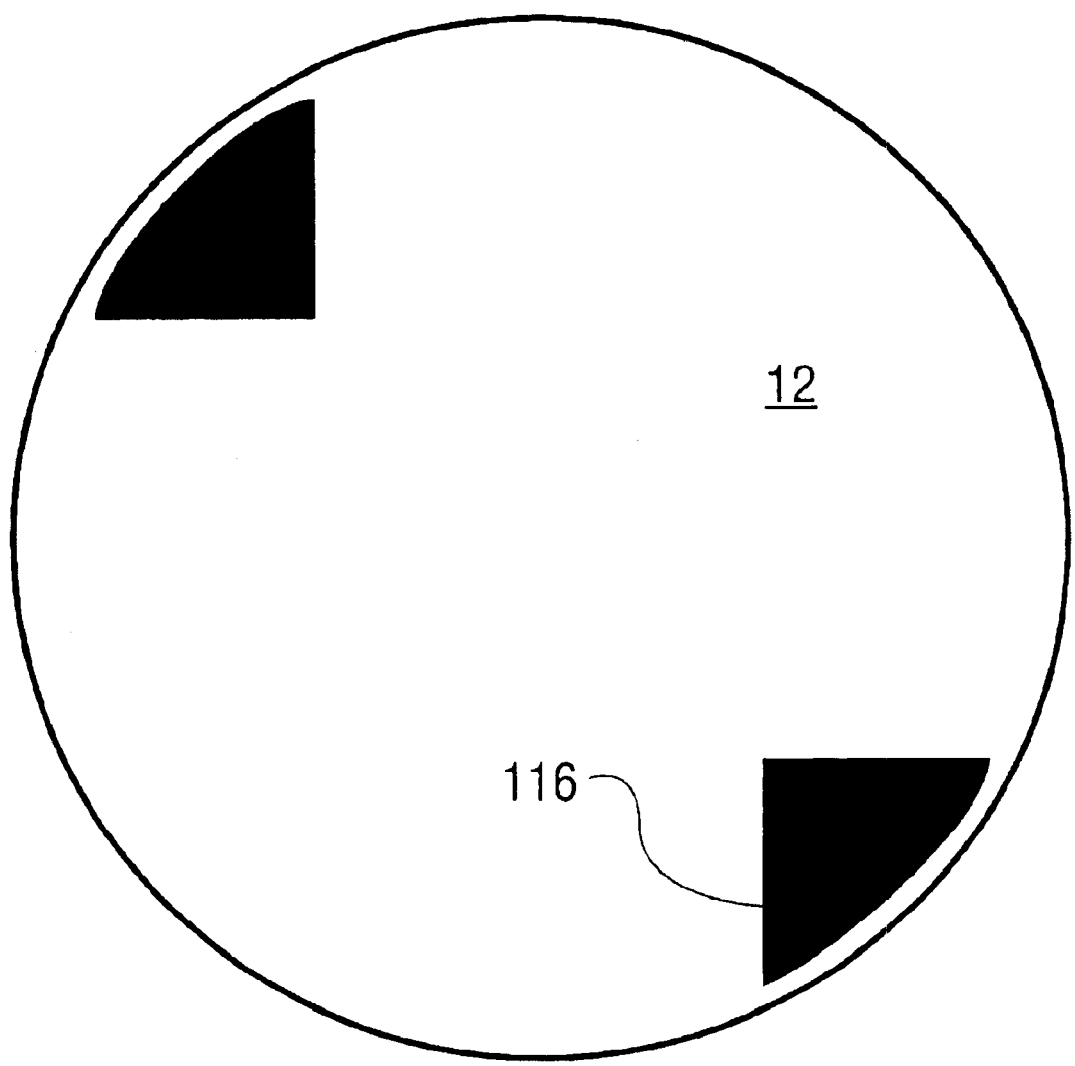

FIGS. 8A, 8B and 8C illustrate yet another embodiment of the invention featuring an alternative mechanism for securing the object, or an object container, to the rims of the moving device. As FIG. 8A illustrates, object 22, or an object container, can be configured to include members 115 projecting from the lateral sides of the object. As FIG. 8B and 8C illustrate, the members 115 engage correspondingly-shaped cutouts 116 in mounting plate 12. In one embodiment, the rims include threaded holes in the region of the cutouts to allow set screws to hold the members 115 in place within cutouts 116 as the moving device rotates. One skilled in the art will recognize that other mechanisms for securing the members 115 within the cutouts 116 of the mounting plate can be used.

Figure 10A:
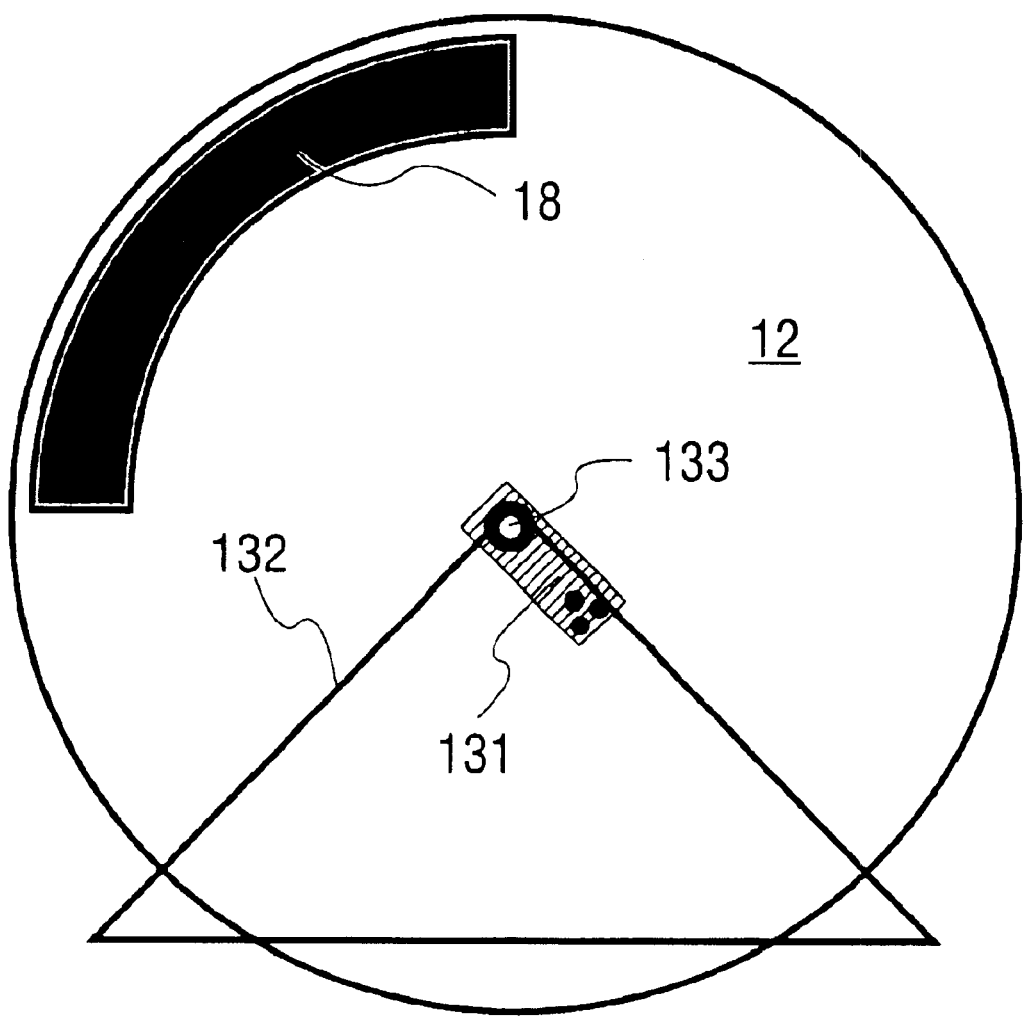
FIGS. 10A and 10B illustrate a moving device according to another embodiment of the present invention.
Figure 10B:
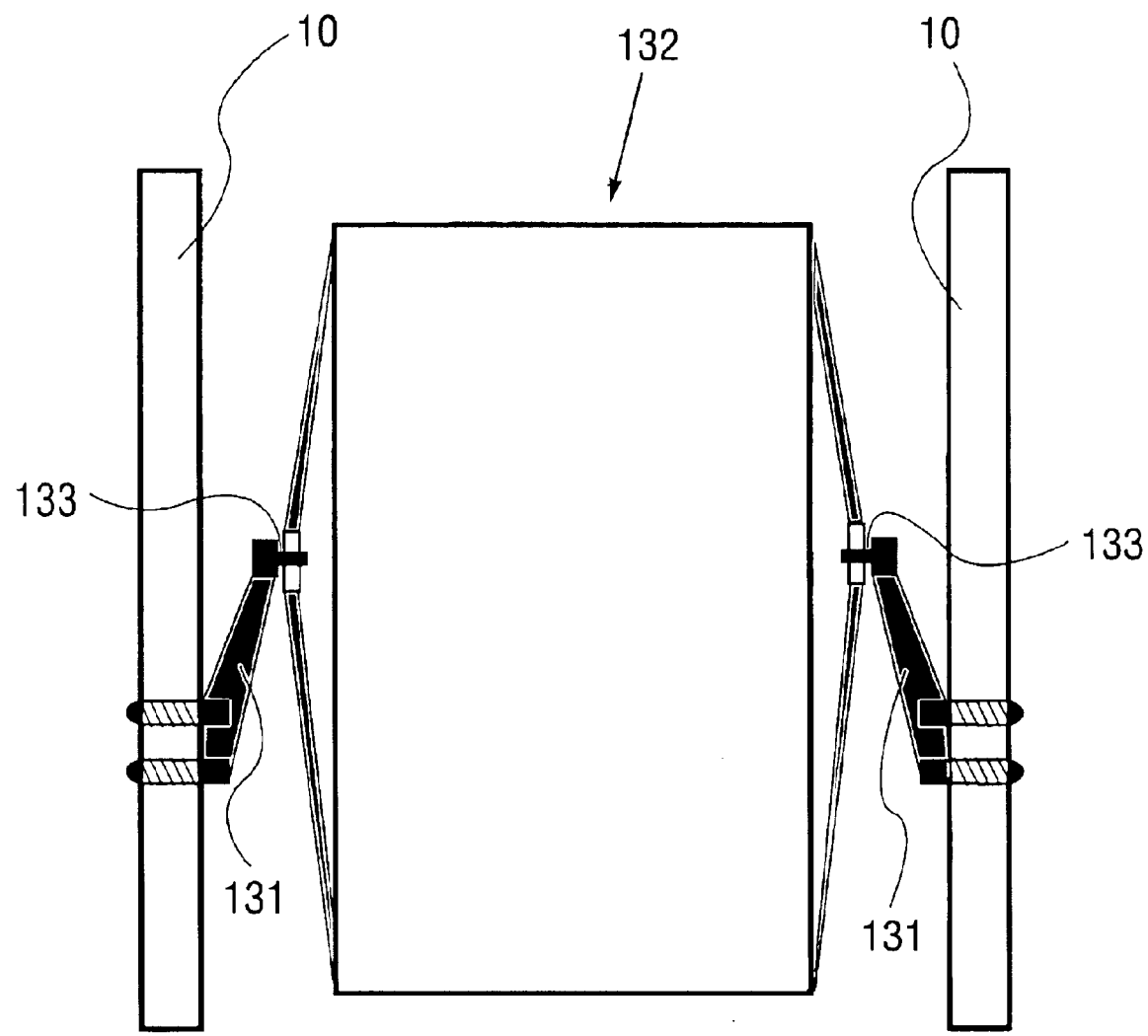

Other embodiments of the present invention feature alternative ways of carrying an object within the two curved rims 10. As FIGS. 10A and 10B illustrate, arms 131 are attached at one end to respective mounting plates associated with curved rims 10. An object carrier 132 pivotally extends between the arms 131 at respective axes 133. Axes 133 are located substantially at the central axis of the curved rims 10. As FIG. 10A illustrates, each arm 131 attaches to the curved rims 10 at a point offset from the central axis such that the weight of an object carried within object carrier 132 is translated to the attachment point of the arms 131 to the mounting plate associated with each curved rim and substantially offset by the counter-balancing weights 18. As the curved rims 10 25 and the arms 131 rotate, object carrier 132 rotates about axes 133 to remain in largely the same orientation relative to the surface over which the curved rims 10 rotate. Furthermore, as one skilled in the art will recognize, the embodiment corresponding to FIGS. 10A and 10B can be adapted to a variety of uses. For example, object carrier 132 can be adapted to carry a palette stacked with boxes and the like. In another embodiment, the object carrier 132 may comprise a seat pivotally attached to and properly balanced on axes 133, creating a device similar to a wheelchair that allows a user to sit in the object carrier and move the device by applying force to both curved rims 10. Still further a supporting rod may extend between axes 133 to enhance the rigidity of the moving device 8.

Figure 15A:
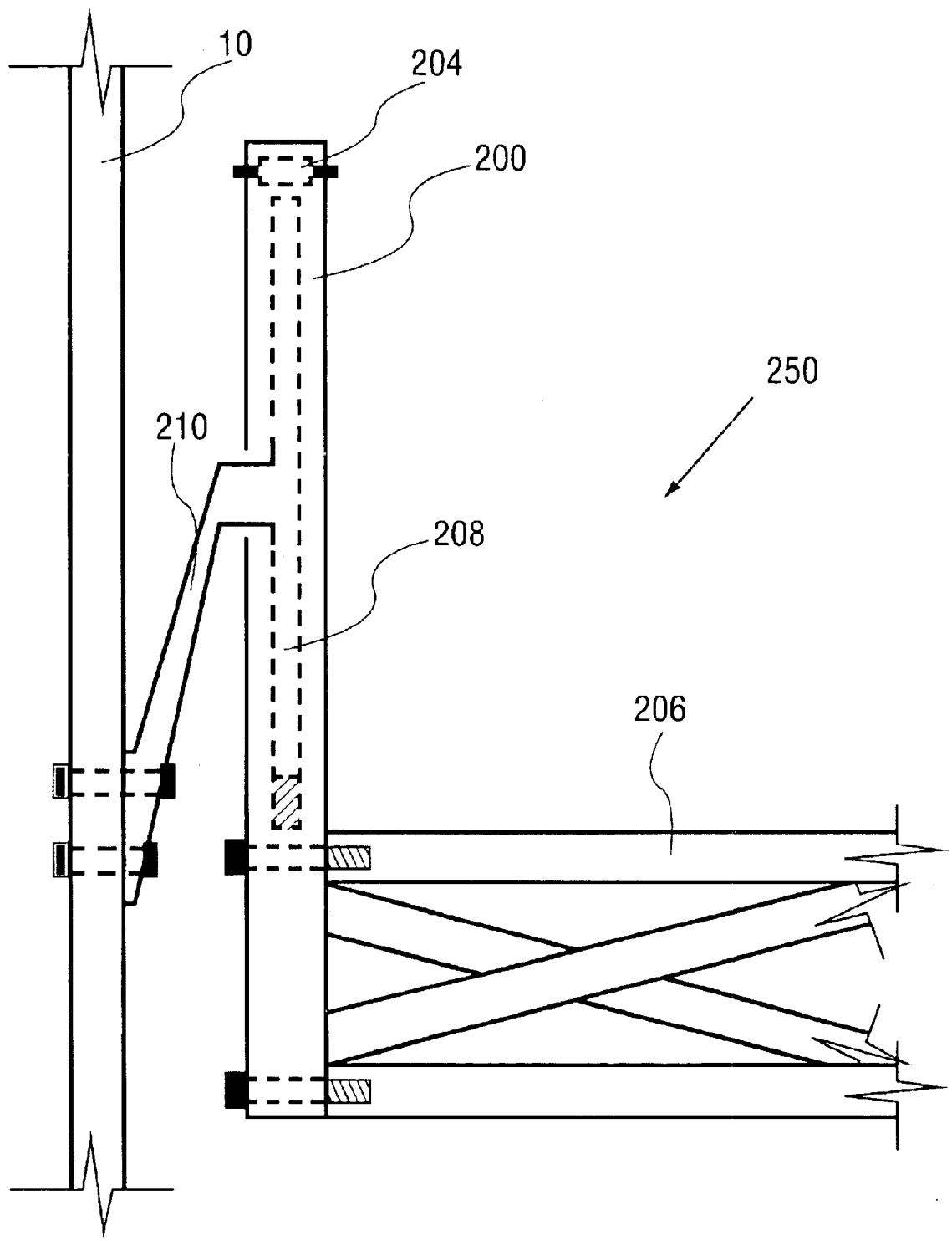
FIGS. 15A, 15B and 15C illustrate a wheelchair incorporating the principles of the present invention.
Figure 15B:
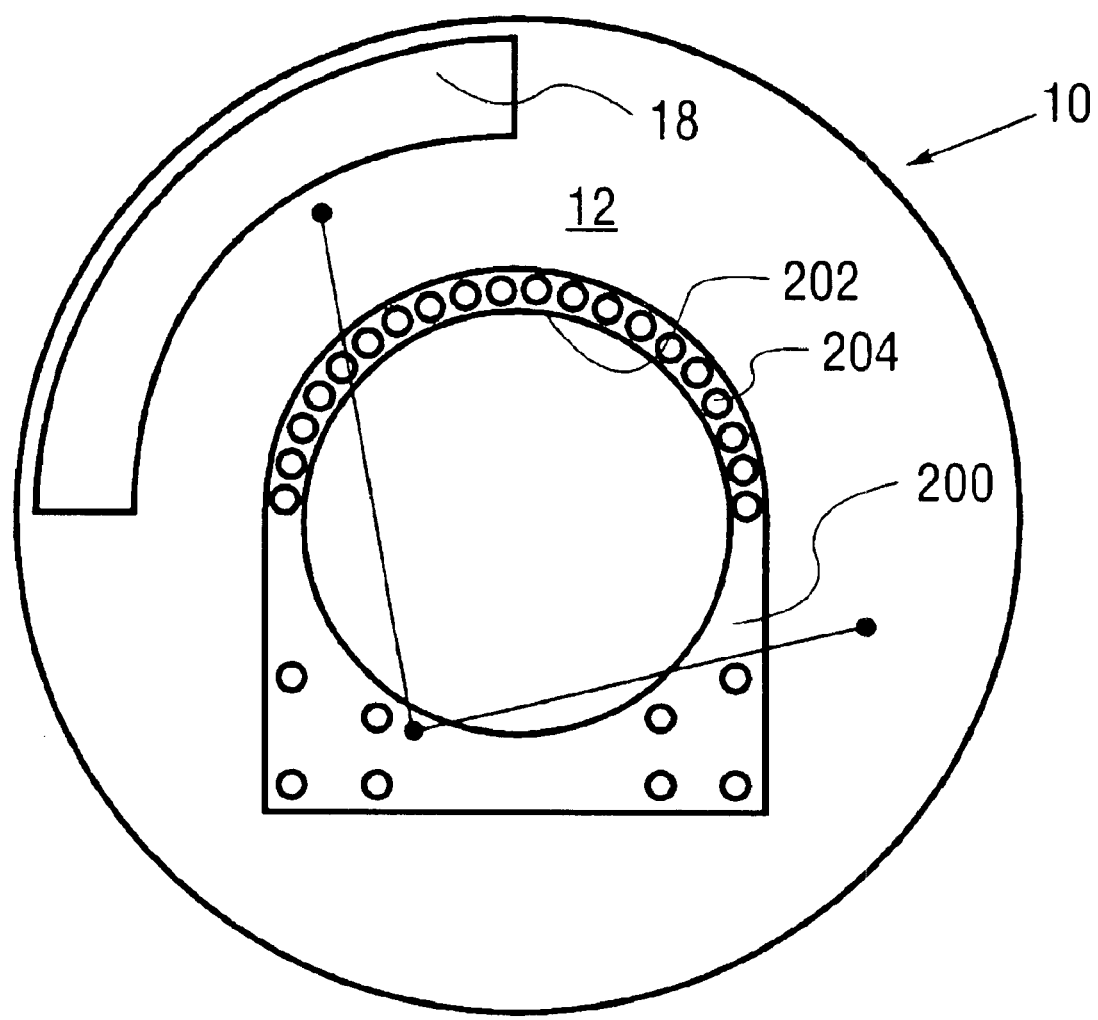
Figure 15C:
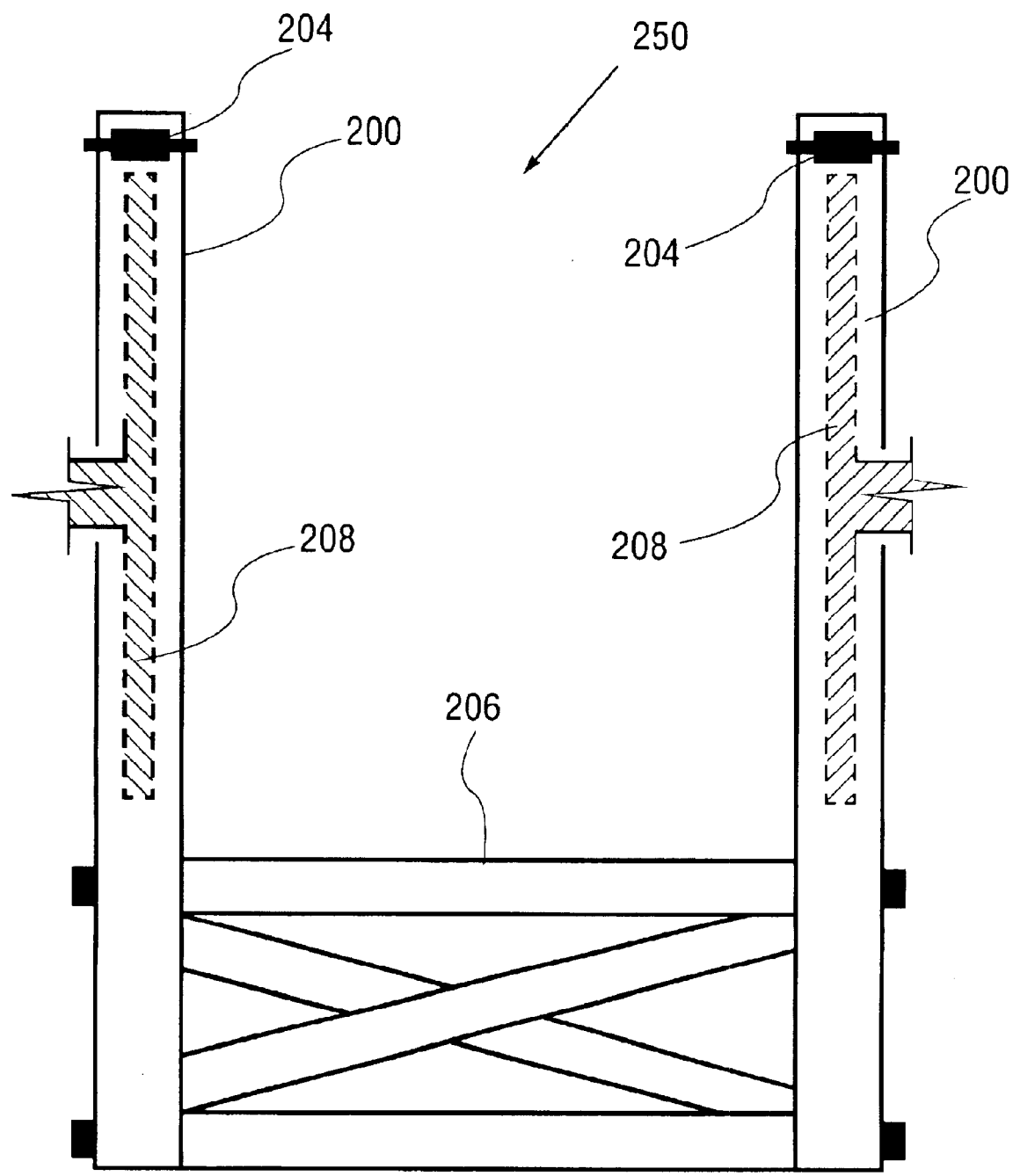

FIGS. 15A, 15B and 15C illustrate a wheelchair incorporating the principles of the present invention. As FIG. 15B illustrates, the chair 250 comprises seat section 206 extending between first and second housings 200. Housings 200 each include cavity 202 and ball bearings 204 supporting rotating plates 208 rotatably located within cavity 202. As FIG. 15A illustrates, arms 210 extend from rotating plates 208 and attached to mounting plates 12 as discussed above. By locating the center of rotating plates 208 substantially at the location of the central axis of the curved rims 10 within respective housings 200, and having the seat section 206 located below the central axis of the rotating plates, the seat remains straight and in one place as the curved rims 10 are rotated. In addition, the chair can be motorized by attaching a motor to housing 200 such that it attaches to and drives the rotating plates 208. In addition, in embodiments where curved rims 10 have a non-circular profile (see above), the profile of cavity 202 and/or the rotating plates 208 can be configured to counter-act the shape of the curved rims 10 such that the chair 250 remains centered, and does not move up and down, as the curved rims 10 rotate.

Figure 12A:
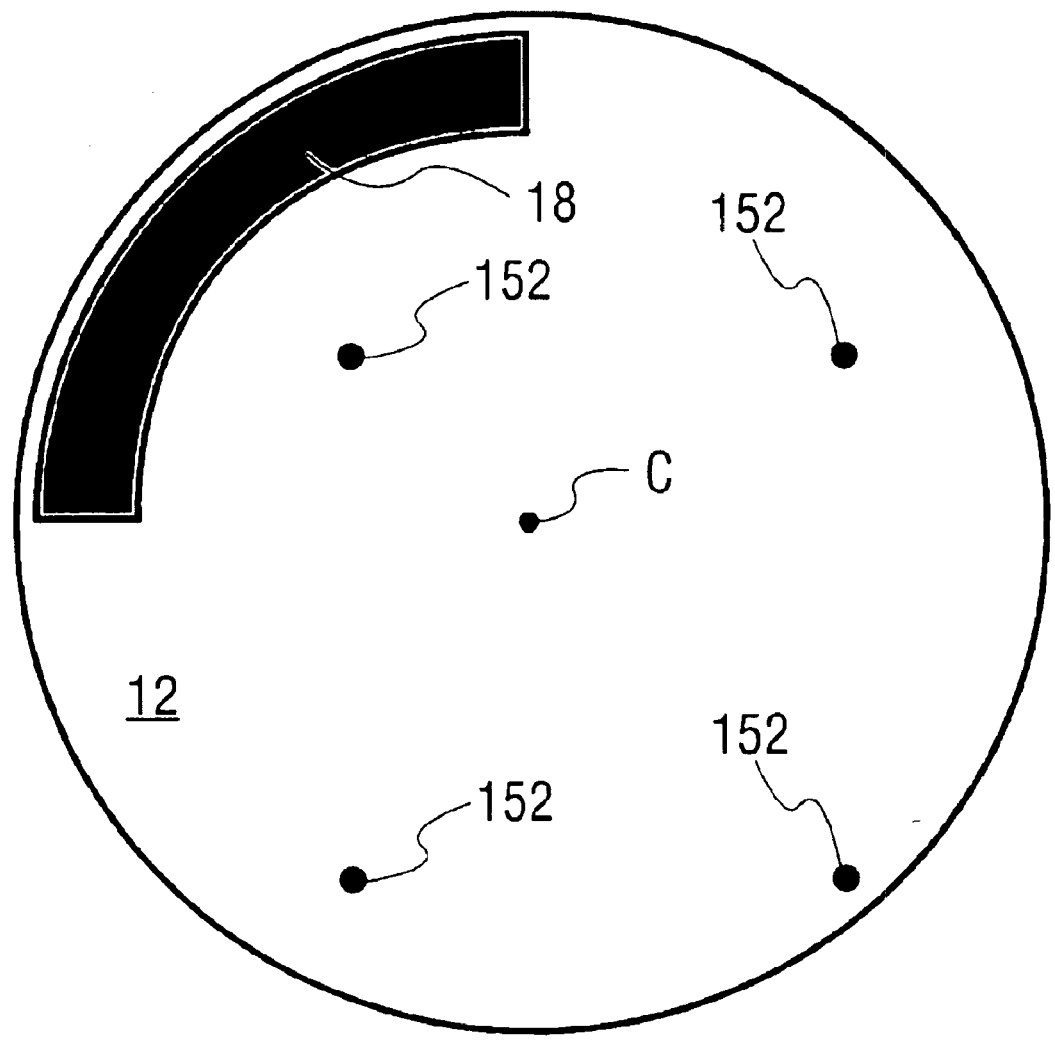
FIGS. 12A and 12B provide a moving device according to an embodiment of the present invention featuring an attachment plate to which an object or object carrier can be secured.
Figure 12B:
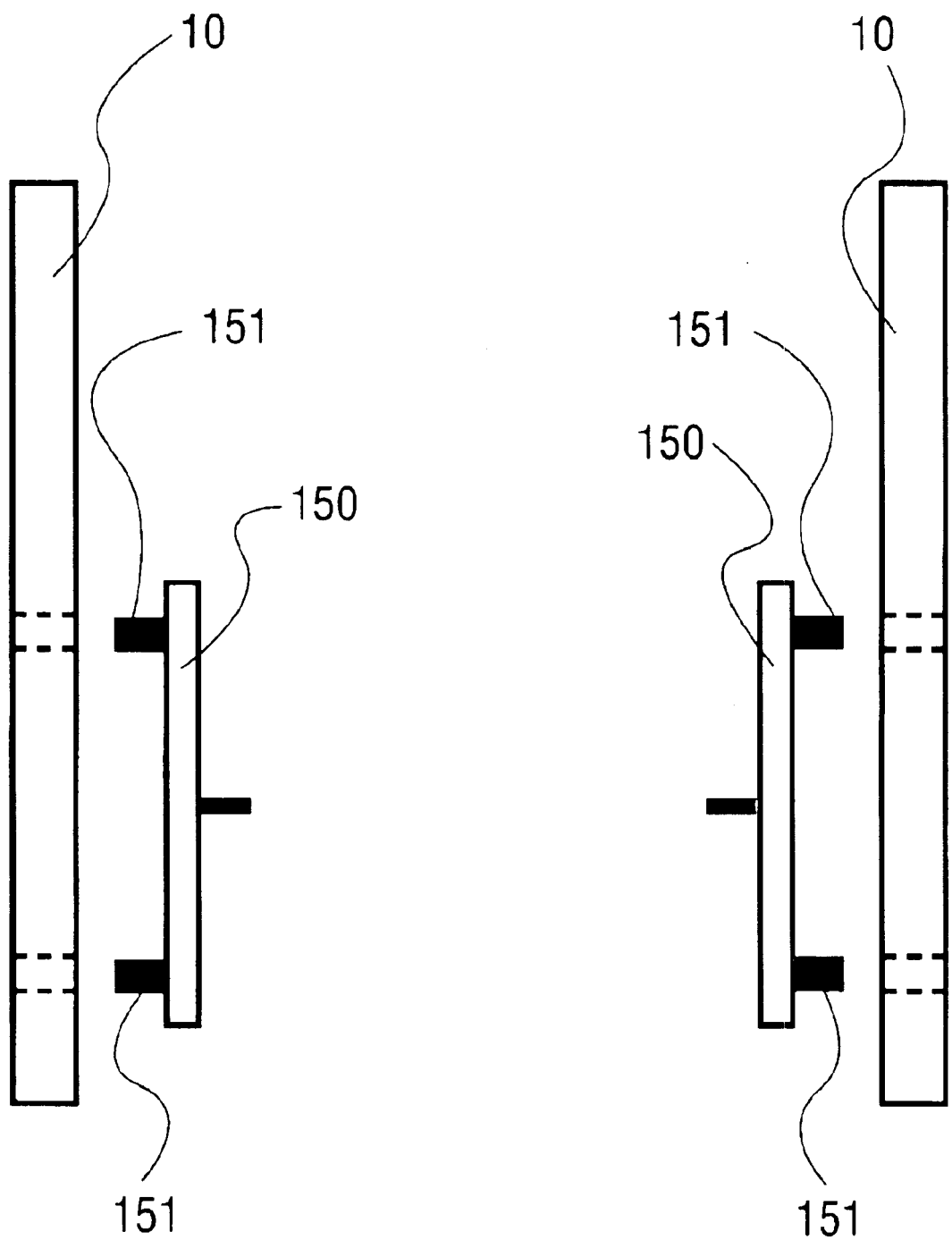

FIGS. 12A and 12B set forth a moving device 8 according to another embodiment of the present invention. As FIG. 12A illustrates, moving device 8 comprises first and second curved rims 10 integrally formed with mounting plates 12. As described more fully below, mounting plate 12 includes at least one counter-balancing weight 18 to offset the moment associated with an object attached to the moving device 8. As FIG. 12A, shows, mounting plates 12 each include holes 152 extending through the mounting plates 12 and arranged, according to one embodiment, in a square pattern. As FIG. 12B illustrates, moving device further includes attachment plates 150. Attachment plates 150 include pegs 151 that engage holes 152 extending through mounting plates 12. In one embodiment, pegs 151 extend through holes 152 and include threads at the outer ends thereof to allow nuts to secure the attachment plates 150 to the respective mounting plates 12. Attachment plates 150 also include attachments, such as pegs 153 or other mounting features, that engage an object or object carrier. In one manner of use, a user may attach the attachment plates 150 to an object or object carrier and then secure the attachment plates 150 to mounting plates 12 associated with curved rims 10. In one embodiment, the object carrier can be pivotally attached to pegs 153 such that the object remains in the same orientation as the moving device 8 rotates about its central axis.

Figure 13A:
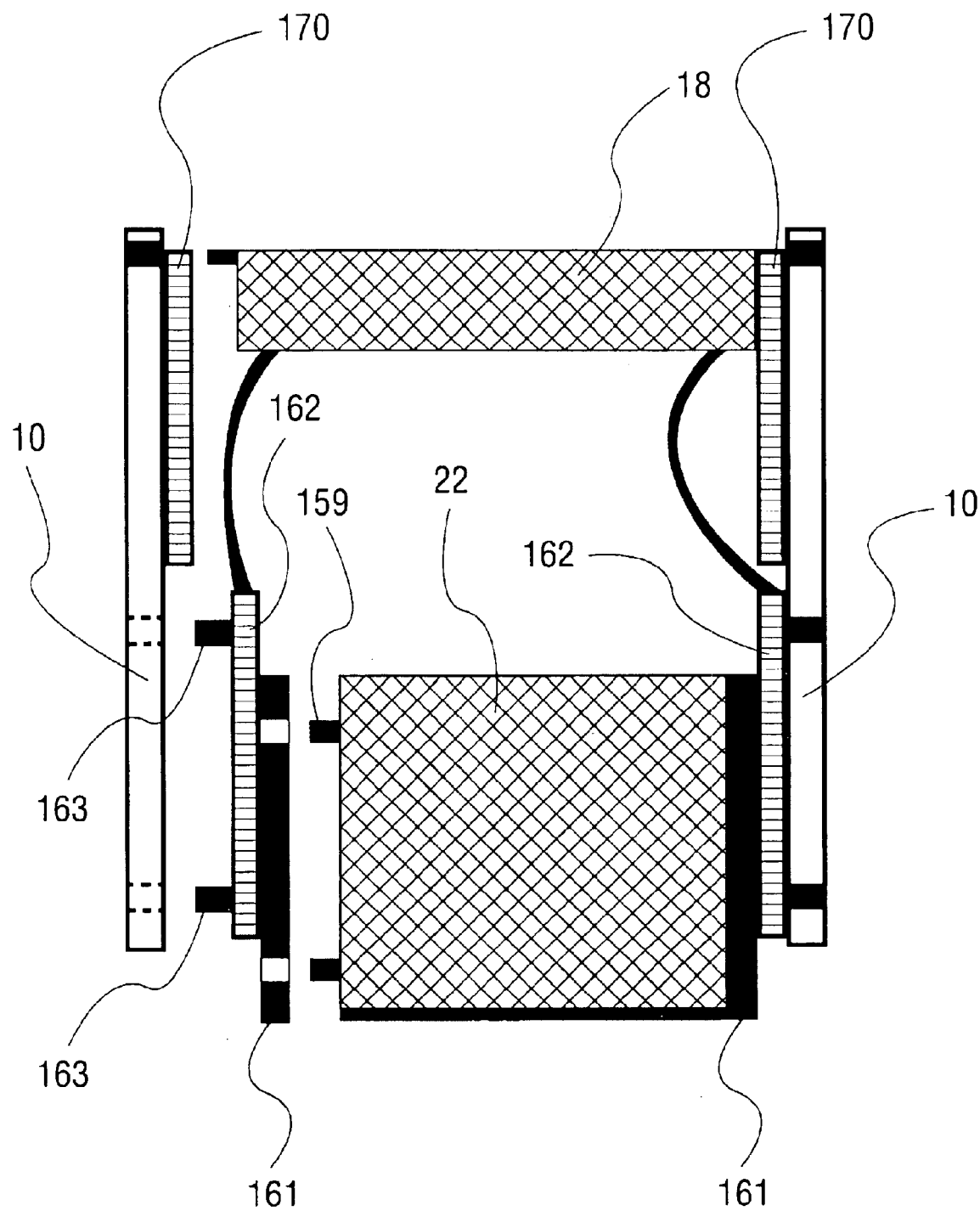
FIGS. 13A, 13B and 13C set forth an embodiment of the moving device including pneumatics that facilitates operation of the device.
Figure 13B:
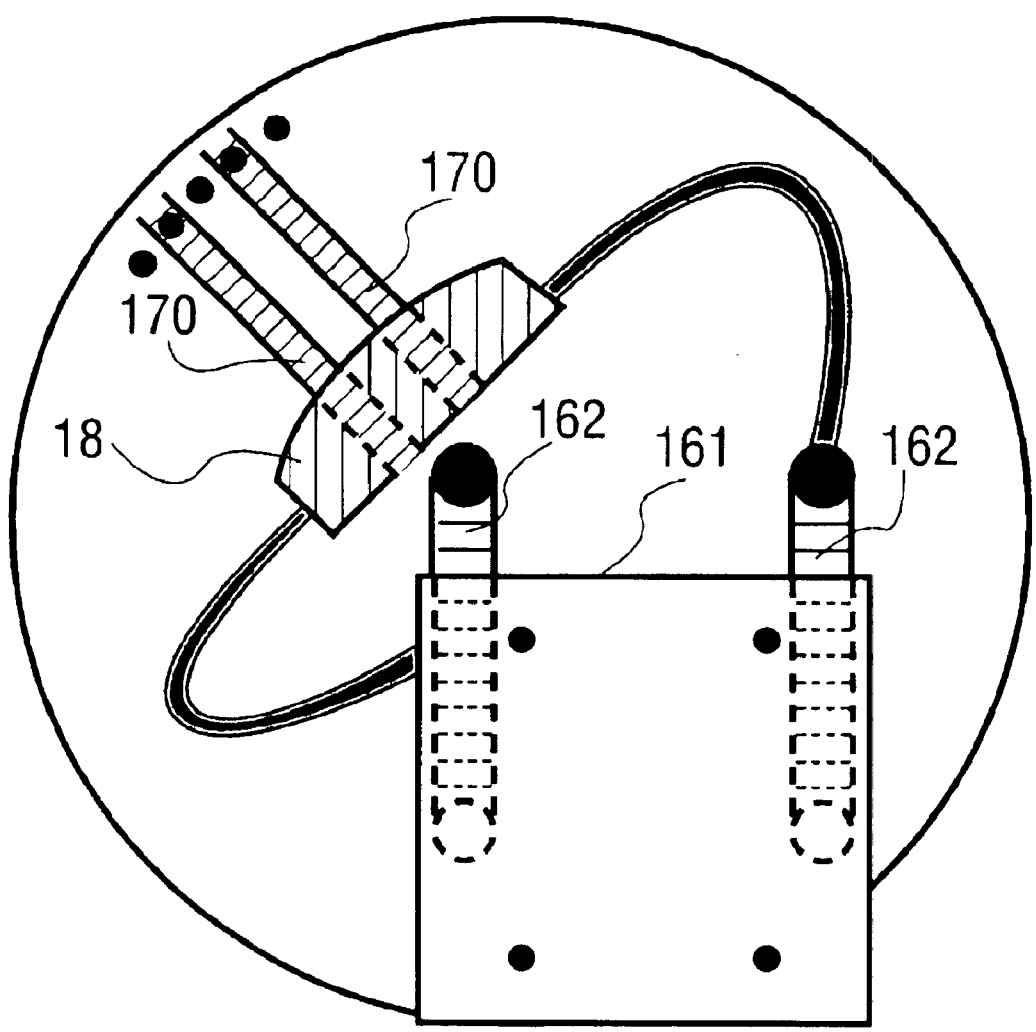
Figure 13C:
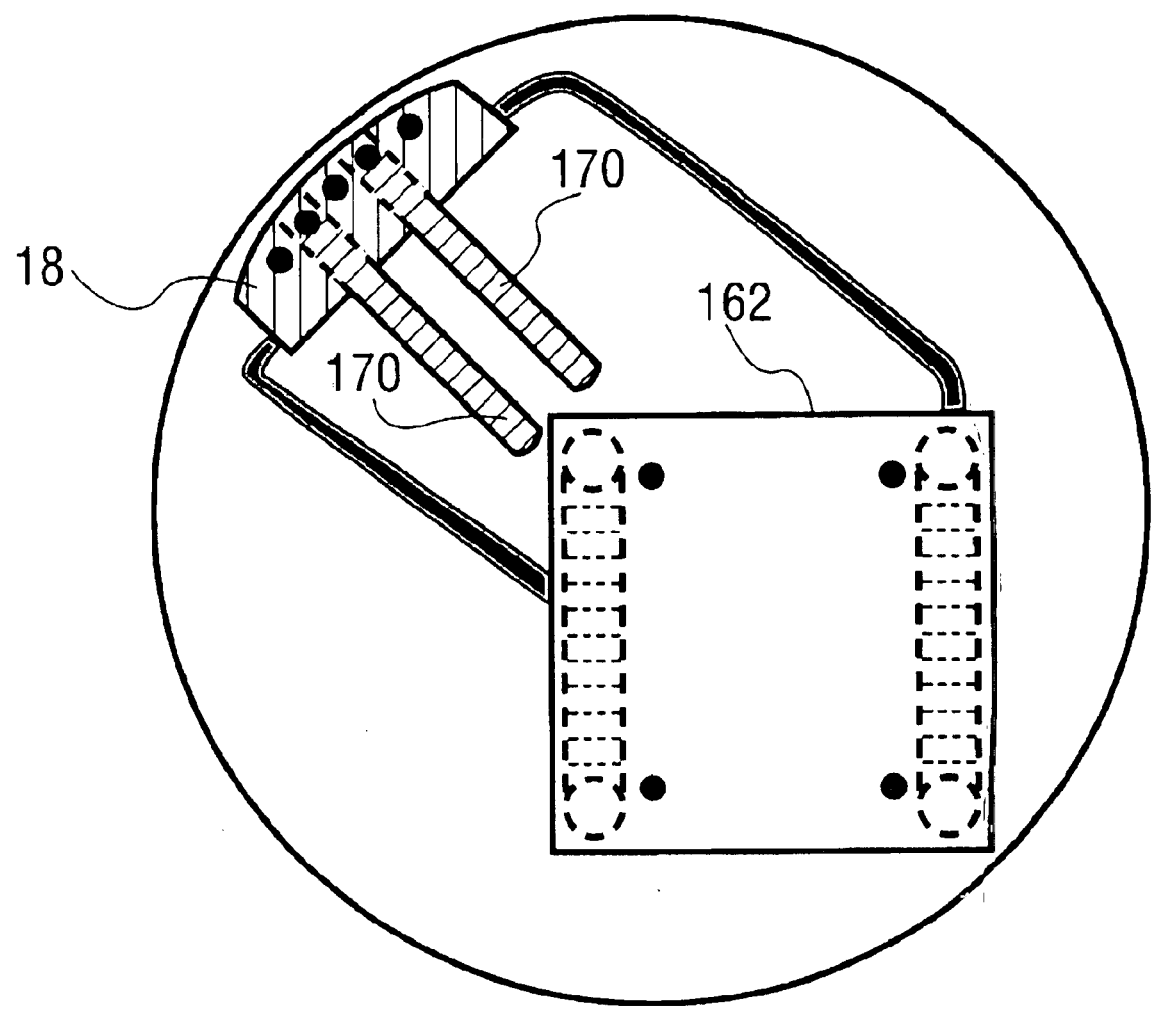

As FIGS. 13A, 13B and 13C illustrate, the moving device 8, according to an embodiment of the present invention, can incorporate tracks associated with the object or counter-balancing weight attachments and devices, motors, hydraulics, etc., to assist with moving the object or counter-balancing weight along the tracks to thereby facilitate use and operation of the device. As FIG. 13B illustrates, counter-balancing weight 18 can be mounted on pneumatically-operated tracks 170, attached to the mounting plate 12, to move the counter-balancing weight 18 towards and away from the central axis of the device. In one embodiment, the counter-balancing weight 18 can include an air compressor to allow for pneumatic operation of the tracks 170. Alternatively, device may include connectors to which a separate air compressor may be attached.

Similarly, the moving device may include pneumatically operated tracks facilitating the lifting of the object 22 or object carrier into place relative to the central axis of the device. For example, the device may include attachment plates 162 that connect to the mounting plates of curved rims 10 via pegs 163, as described above. According to an embodiment of the present invention, the attachment plates 162 include pneumatically-operated tracks that attach to plates 161 that include features, such as holes, allowing for attachment of object 22 (or an object container/carrier) via pegs 159. In use, the user may rotate the device over the object and lower plate 161 and attach the object thereto (See FIG. 13B). Once attached, the user operates the tracks to raise the plates 161 and the object 22 into place, as shown in FIG. 13C. As one skilled in the art will recognize, the tracks may also be actuated by hydraulic means, and mechanical or electrical motors.

Lastly, although the present invention has been described with reference to specific embodiments, various other embodiments are possible without departing from the scope of the present invention. Other embodiments of the present invention will be apparent to one of ordinary skill in the art. It is, therefore, intended that the claims set forth below not be limited to the embodiments described above.

What is claimed is:

1. An apparatus facilitating the movement of an object held therein, comprising
a curved rim having a central axis;
a mounting plate attached to and extending within the curved rim,
wherein the mounting plate includes a cavity and means to secure an object therein; and
a counter-balancing weight attached to the mounting plate, and in substantially opposing relation to the cavity;
wherein the counter-balancing weight comprises a chamber adapted to be filled with a material.

2. The apparatus of claim 1 wherein the curved rim comprises a plurality of sections, wherein the center of gravity of the object is located in a first section, and wherein the center of gravity of the counter-balancing weight is located in a section opposite the first section.

3. The apparatus of claim 1 wherein the curved rim comprises first, second, third and fourth quadrants, wherein the counter-balancing weight is attached to the mounting plate in the first quadrant, and wherein the center of gravity of the object is located in the third quadrant opposite the first quadrant.

4. The apparatus of claim 3 wherein the curved rim, in the second quadrant between the first and third quadrants, includes a section having an increased radius of curvature relative to the radius of curvature of the first and third quadrants.

5. The apparatus of claim 4 wherein the curved rim, in the fourth quadrant opposite the second quadrant, includes a section having an increased radius of curvature relative to the radius of curvature of the first and third quadrants.

6. The apparatus of claim 1 wherein the mounting plate includes a cavity therein, and wherein the securing means comprises adjustment bars attached to the mounting plate and adapted to hold the object against opposing sides of the cavity.

7. The apparatus of claim 1 wherein the securing means comprises an arm attached at a first end to the mounting plate at an attachment point offset from the central axis of the curved rim, an object carrier pivotally attached to a second end of the arm.

8. The apparatus of claim 1 wherein the mounting plate includes a matrix of holes therethrough, and wherein the securing means comprises an attachment plate comprising at least one peg selectively and releasably engageable in the holes.

9. The apparatus of claim 1 further comprising
a second curved rim having a central axis;
a second mounting plate extending within the second curved rim,
means to releasably secure the object to the second mounting plate, wherein the center of gravity of the object is spaced from the central axis of the second curved rim, and
a second counter-balancing weight attached to the second mounting plate and spaced from the central axis of the second curved rim, wherein the second counter-balancing weight, in combination with the first counter balancing weight, is configurable to gravitationally offset the object.

10. The apparatus of claim 9 further comprising an object attached to the first and second mounting places by the securing means.

11. The apparatus of claim 1 further comprising a turning mechanism attached to the curved rim, wherein the turning mechanism is configured to be selectively engagable against the outer surface of the curved rim to increase the circumference thereof.

12. The apparatus of claim 9 further comprising at least one crossbar extending between the first and second curved rims.

13. An apparatus facilitating the movement of an object held therein, comprising
a curved rim having a central axis;
a mounting plate attached to and extending within the curved rim,
wherein the mounting plate includes a cavity and means to secure an object therein; and
a counter-balancing weight attached to the mounting plate, and in substantially opposing relation to the cavity;
wherein the curved rim includes a hollow section proximal to the counter-balancing weight, wherein the curved rim further includes an opening to the hollow section for the receipt of counter-balancing materials.

14. An apparatus facilitating the movement of an object held therein, comprising
a curved rim having a central axis;
a mounting plate attached to and extending within the curved rim,
wherein the mounting plate includes a cavity and means to secure an object therein; and
a counter-balancing weight attached to the mounting plate, and in substantially opposing relation to the cavity;
wherein the curved rim comprises a C-shaped section and a removable section, wherein the inner edge of the removable section substantially defines the outer edge of the cavity.

15. The apparatus of claim 14 wherein the curved rim comprises first, second, third and fourth quadrants, wherein the counter-balancing weight is attached to the mounting plate in the first quadrant, and wherein the center of gravity of the object is located in the third quadrant opposite the first quadrant.

16. The apparatus of claim 15 wherein the curved rim includes a section having an increased radius of curvature relative to the first and third quadrants in the second quadrant between the first and third quadrants.

17. The apparatus of claim 16 wherein the curved rim includes a section having an increased radius of curvature in the fourth quadrant opposite the second quadrant.

18. The apparatus of claim 14 wherein the center of the cavity is offset from the central axis of the curved rim.

19. The apparatus of claim 14 wherein the counter-balancing weight is offset from the central axis of the curved rim and configured to offset the moment created by an object disposed within the cavity.

20. The apparatus of claim 14 wherein the curved rim includes a hollow section proximal to the counter-balancing weight, wherein the rim further includes an opening to the hollow section for the receipt of counter-balancing materials.

21. The apparatus of claim 14 further comprising
a second curved rim having a central axis;
a second mounting plate attached to and extending within the second curved rim,
   wherein the second mounting plate includes a cavity and means to secure an object therein; and
a second counter-balancing weight attached to the second mounting plate wherein the second counter-balancing weight, in combination with the first counter balancing weight, is configured to gravitationally offset the object.

22. The apparatus of claim 21 further comprising an object located within the cavities of the first and second mounting plates, wherein the first and second curved rims are oriented at opposing sides of the object.

23. The apparatus of claim 14 wherein the counter-balancing weight comprises at least one weight removably attached to the mounting plate.

24. The apparatus of claim 14 wherein the counter-balancing weight comprises a chamber adapted to be filled with a material.

* * * * *

UNITED STATES PATENT AND TRADEMARK OFFICE
CERTIFICATE OF CORRECTION

PATENT NO. : 6,854,751 B2
DATED : February 15, 2005
INVENTOR(S) : Halke

It is certified that error appears in the above-identified patent and that said Letters Patent is hereby corrected as shown below:

Column 10,
Line 5, replace "places" with -- plates --

Signed and Sealed this

Fifth Day of July, 2005

JON W. DUDAS
*Director of the United States Patent and Trademark Office*